(12) United States Patent
Suzuki et al.

(10) Patent No.: US 8,304,167 B2
(45) Date of Patent: *Nov. 6, 2012

(54) OPTICAL INFORMATION RECORDING MEDIUM

(75) Inventors: Yusuke Suzuki, Miyagi (JP); Takao Kudo, Miyagi (JP); Kazuya Hayashibe, Saitama (JP); Hiroshi Uchiyama, Miyagi (JP)

(73) Assignee: Sony Corporation, Tokyo (JP)

( * ) Notice: Subject to any disclaimer, the term of this patent is extended or adjusted under 35 U.S.C. 154(b) by 522 days.

This patent is subject to a terminal disclaimer.

(21) Appl. No.: 12/494,661

(22) Filed: Jun. 30, 2009

(65) Prior Publication Data

US 2010/0003447 A1    Jan. 7, 2010

(30) Foreign Application Priority Data

Jul. 2, 2008    (JP) .................. 2008-173667

(51) Int. Cl.
G11B 7/24    (2006.01)

(52) U.S. Cl. ............. 430/280.1; 430/281.1; 430/269; 369/284; 369/288

(58) Field of Classification Search .............. None
See application file for complete search history.

(56) References Cited

U.S. PATENT DOCUMENTS

| | | | | |
|---|---|---|---|---|
| 3,903,322 A | * | 9/1975 | Ravve et al. | 427/519 |
| 4,442,022 A | * | 4/1984 | van der Hauw et al. | 502/150 |
| 7,446,159 B1 | * | 11/2008 | Samukawa et al. | 526/284 |
| 2003/0012562 A1 | | 1/2003 | Lawandy et al. | |
| 2004/0014833 A1 | * | 1/2004 | Bradley | 522/6 |
| 2004/0186195 A1 | * | 9/2004 | Suzuki et al. | 522/31 |
| 2006/0172230 A1 | * | 8/2006 | Lawton et al. | 430/322 |
| 2008/0186840 A1 | * | 8/2008 | Uchiyama et al. | 369/288 |
| 2008/0205257 A1 | * | 8/2008 | Yamatsu et al. | 369/284 |
| 2010/0003617 A1 | * | 1/2010 | Suzuki et al. | 430/270.11 |

FOREIGN PATENT DOCUMENTS

| | | | |
|---|---|---|---|
| JP | 03-052142 A | | 3/1991 |
| JP | 03-224792 A | | 10/1991 |
| JP | 04-001203 | * | 1/1992 |
| JP | 07-043854 A | | 2/1995 |
| JP | 08-319305 | * | 12/1996 |
| JP | 11-254827 A | | 9/1999 |
| JP | 2000-276767 A | | 10/2000 |
| JP | 2001-081292 | * | 3/2001 |
| JP | 2001-292648 | * | 10/2001 |
| JP | 2004-083855 | * | 3/2004 |
| JP | 2005-037658 | | 2/2005 |
| JP | 2005-539343 A | | 12/2005 |
| JP | 2007-233165 A | | 9/2007 |
| JP | 2008-071433 | | 3/2008 |
| JP | 2008-087476 A | | 4/2008 |
| JP | 2008-287754 A | | 11/2008 |
| JP | 2009-059404 A | | 3/2009 |
| JP | 2009-140526 A | | 6/2009 |
| JP | 2009-140527 A | | 6/2009 |
| KR | 2008036533 | * | 4/2008 |
| WO | 2006/029095 | * | 3/2006 |

* cited by examiner

*Primary Examiner* — Martin Angebranndt
(74) *Attorney, Agent, or Firm* — Wolf, Greenfield & Sacks, P.C.

(57) ABSTRACT

An optical information recording medium includes a recording layer that absorbs recording light in accordance with its wavelength, the recording light being condensed for information recording, and increases the temperature in the vicinity of a focus so as to form a recording mark and that has properties of increasing a light absorption amount with respect to the wavelength of the recording light by heating performed at a temperature of 120° C. or more.

26 Claims, 8 Drawing Sheets

OPTICAL INFORMATION RECORDING MEDIUM

BACKGROUND OF THE INVENTION

1. Field of the Invention

The present invention relates to an optical information recording medium that is preferably used as an optical information recording medium in which, for example, information is recorded using light beams and is reproduced using the light beams.

2. Description of the Related Art

Heretofore, as an optical information recording medium, a disc-shaped optical information recording medium has been widely used, and in general, a compact disc (CD), a digital versatile disc (DVD), a Blu-ray disc (registered trademark, hereinafter referred to as "BD"), and the like have been used.

In addition, an optical information recording/reproducing device using the optical information recording medium described above is designed so as to record various types of information, such as various types of contents including music contents and image contents or various types of data for computers, in the optical information recording medium. In particular, recently, since the amount of information has been increased due to, for example, a higher degree of image fineness and a higher degree of sound quality, and in addition, since an increase in the number of contents to be recorded in one optical information recording medium has been requested, the optical information recording medium is further desired to have a larger recording capacity.

Accordingly, as one method for increasing the capacity of an optical information recording medium, an optical information recording medium has been proposed in which microscopic holograms formed by interfering light beams of two systems are used as recording marks and are overlapped with each other in the thickness direction of the optical information recording medium so as to record information in one recording layer which corresponds to that recorded in a plurality of layers (for example, see Japanese Patent Application Laid-Open No. 2008-71433).

SUMMARY OF THE INVENTION

However, the optical information recording medium disclosed in the above document has the shortcoming in that the optical system thereof is complicated since light beams of two systems are inevitably used. In addition, another optical information recording medium has also been proposed in which heat generated by radiated light beams of one system is used to form cavities (air bubbles) in the vicinity of a focus of the light beams, and by using these cavities as recording marks, information corresponding to that recorded in a plurality of layers is recorded in one recording layer (for example, see Japanese Patent Application Laid-Open No. 2005-37658).

Since a pulse laser having a high peak power is used to record information in the optical information recording medium disclosed in the above document, a drive system may not be easily realized in practice. In addition, when a continuous-oscillation laser is simply used, since a high transmittance requested for forming a multilayer structure and a high absorption factor requested in the vicinity of the focus conflict with each other, the absorption factor in the vicinity of the focus may not be significantly increased, and hence, in order to form the recording marks, irradiation may be inevitably performed for a long period of time.

The present invention has been conceived in consideration of the problems described above, and it is desirable to provide an optical information recording medium capable of improving a recording rate.

In an optical information recording medium according to an embodiment of the present invention that is designed to overcome the above problems, a recording layer is provided that has properties of increasing a light absorption amount with respect to the wavelength of recording light when heating is performed at a temperature of 100° C. or more and that absorbs the recording light in accordance with its wavelength, the recording light being condensed for information recording, and increases the temperature in the vicinity of a focus so as to form a recording mark.

Accordingly, in this optical information recording medium, since the light absorption amount in the vicinity of the focus can be increased in response to the irradiation of the recording light, the recording light can be efficiently absorbed, and the temperature in the vicinity of the focus can be rapidly increased, so that the recording mark can be formed within a short period of time.

In addition, in an optical information recording medium according to an embodiment of the present invention, a recording layer is provided that absorbs recording light in accordance with its wavelength, the recording light being condensed for information recording, and increases the temperature in the vicinity of a focus so as to form a recording mark and that includes an acid generator generating an acid and an acid-reactive compound that is modified by an acid and heat to increase a light absorption amount with respect to the recording light.

Accordingly, in this optical information recording medium, since the light absorption amount in the vicinity of the focus can be increased in response to the irradiation of the recording light, the recording light is efficiently absorbed, and the temperature in the vicinity of the focus can be rapidly increased, so that the recording mark can be formed within a short period of time.

Furthermore, in an optical information recording medium according to an embodiment of the present invention, a recording layer is provided that includes a cation generating photopolymerization initiator or a Lewis acid compound, each having a vaporizing temperature in the range of 140° C. to 400° C., and an acid-reactive compound to be modified by an acid generated from the cation generating photopolymerization initiator or the Lewis acid compound described above and that when recording light is condensed for information recording, increases the temperature in the vicinity of a focus of the recording light to vaporize the photopolymerization initiator or the Lewis acid compound so as to form a cavity as a recording mark.

Accordingly, since being able to increase a light absorption amount in the vicinity of the focus in response to the irradiation of the recording light, the optical information recording medium can efficiently absorb the recording light and increase the temperature in the vicinity of the focus, so that the recording mark can be formed within a short period of time.

Furthermore, in an optical information recording medium according to an embodiment of the present invention, a recording layer is provided that absorbs recording light in accordance with its wavelength, the recording light being condensed for information recording, and increases the temperature in the vicinity of a focus to form a recording mark and that includes an acid generator generating an acid and a compound having a fluorene structure represented by the following general formula (1).

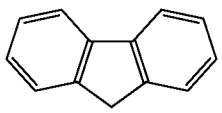

General Formula (1)

Accordingly, in the optical information recording medium, since the light absorption amount in the vicinity of the focus can be increased in response to the irradiation of the recording light, the recording light can be efficiently absorbed, and the temperature in the vicinity of the focus can be rapidly increased, so that the recording mark can be formed within a short period of time.

According to the present invention, since the light absorption amount in the vicinity of the focus can be increased in response to the irradiation of the recording light, the recording light can be efficiently absorbed, the temperature in the vicinity of focus can be rapidly increased, and the recording mark can be formed within a short period of time; hence, an optical information recording medium capable of improving a recording rate can be realized.

DESCRIPTION OF THE PREFERRED EMBODIMENTS

Hereinafter, with reference to the accompanying drawings, one embodiment of the present invention will be described in detail.

(1) STRUCTURE OF OPTICAL INFORMATION RECORDING MEDIUM

Figure 1A:
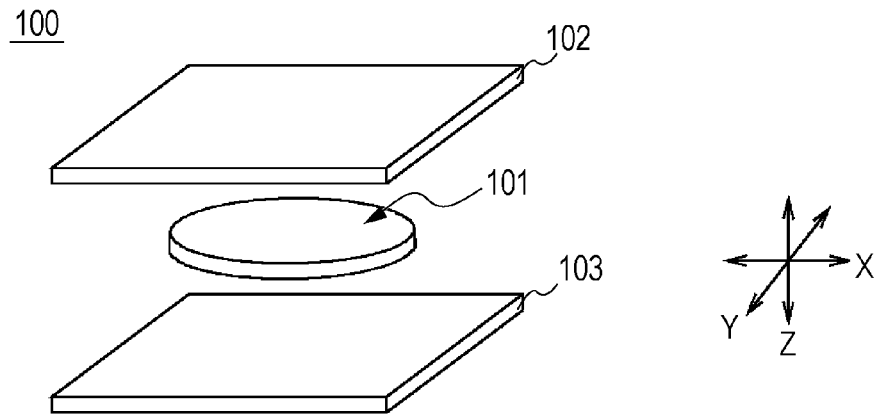
FIGS. 1A to 1C are schematic views each showing the structure of an optical information recording medium.
Figure 1B:
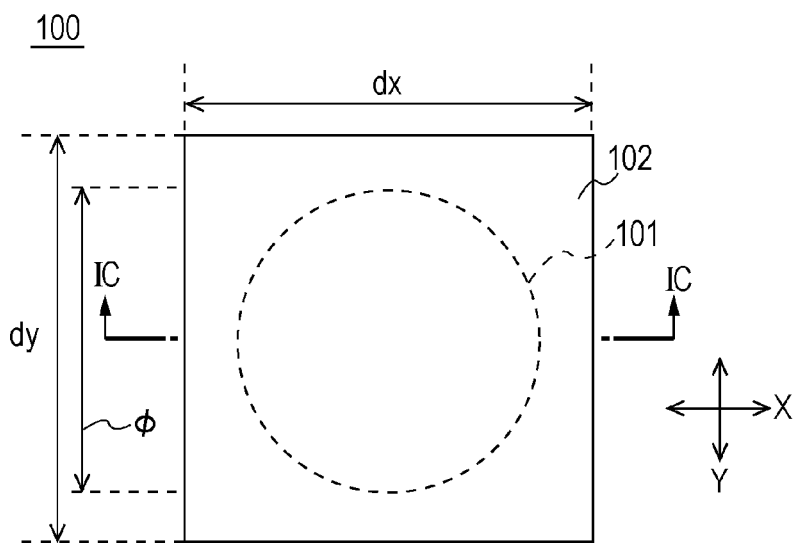
Figure 1C:
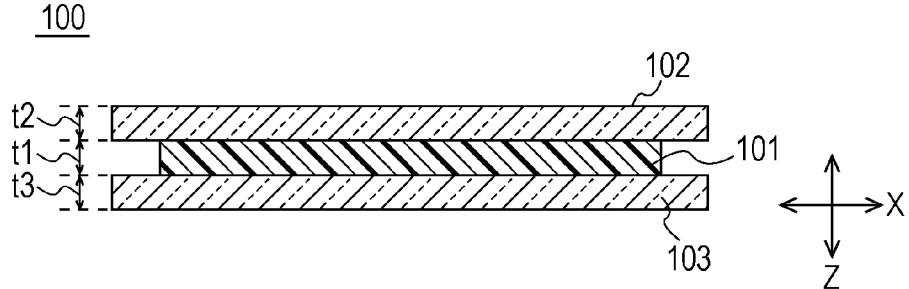

As shown in FIGS. 1A to 1C, an optical information recording medium 100 is formed, as a whole, such that a recording layer 101 is provided between substrates 102 and 103 so as to function as a medium to record information. The shape of the optical information recording medium 100 is not particularly limited, and of course, a rectangular shape as shown in FIG. 1 may be formed, and a disc having a diameter of 120 mm, such as a general optical disc including a BD (Blu-ray Disc, registered trademark) and a DVD (digital versatile disc), may also be formed to have a clamping hole at the center thereof.

The substrates 102 and 103 are formed of glass so as to transmit light at a high rate. In addition, the substrates 102 and 103 are formed to have a square shape or a rectangular shape in which a length dx in an X direction and a length dy in a Y direction are set to approximately 50 mm, and in which thicknesses t2 and t3 are set to approximately 0.05 to 1.2 mm.

An antireflection coating (AR) treatment forming, for example, a four-layer inorganic film ($Nb_2O_5/SiO_2/Nb_2O_5/SiO_2$) that is non-reflective to light beams having a wavelength of 405 to 406 nm is performed on outside surfaces (which are not in contact with the recording layer 101) of the substrates 102 and 103.

As the substrates 102 and 103, various optical materials, such as an acrylic resin and a polycarbonate resin, may also be used as well as a glass plate. The thicknesses t2 and t3 of the substrates 102 and 103 are not limited to those described above and may also be appropriately selected outside the range of 0.05 to 1.2 mm. In addition, the AR treatment may not be performed on the outside surfaces of the substrates 102 and 103 in some cases.

In addition, after a liquid material M1 (will be described later in detail), which is an uncured material to form photopolymers, for example, by polymerization, is spread on an upper portion of the substrate 103, the substrate 102 is placed on the liquid material M1, so that an uncured optical information recording medium (hereinafter referred to as "uncured optical information recording medium 100a) which contains the liquid material M1 at a position at which the recording layer 101 shown in FIG. 1 is to be provided.

As described above, in the uncured optical information recording medium 100a, the liquid material M1, which is to be formed into photopolymers, is provided between the transparent substrates 102 and 103, so that a thin plate is formed as a whole.

A photo-polymerizing or a photo-crosslinking resin material (hereinafter referred to as "photo-curing resin") forming part or most of the liquid material M1 contains, for example, radical polymerizable monomers and a radical generating photopolymerization initiator; cationic polymerizable monomers and a cation generating photopolymerization initiator; or a mixture of the above two.

That is, in the liquid material M1, monomers, oligomers, or a mixture thereof (hereinafter, those mentioned above will be referred to as "monomer(s)") are uniformly dispersed. When this liquid material M1 is irradiated with light, the monomers located at a position irradiated with light are polymerized (that is, are photopolymerized) to form photopolymers, and as a result, the refractive index and the reflectance of the liquid material M1 are changed. In addition, when the liquid material M1 is irradiated with light, so-called photo-crosslinking is generated in which "crosslinking" occurs between the photopolymers and in which the molecular weight is increased, and as a result, the refractive index and the reflection coefficient may be further changed in some cases.

As the monomers, common monomers may be used. As the radical polymerizable monomers, for example, monomers used for radical polymerization reaction, such as acrylic acid, acrylic acid ester, acrylic amide, and derivatives thereof; and styrene, vinyl naphthalene, and derivatives thereof, may be particularly mentioned. In addition, a compound having an acrylic group in a urethane structure may also be used. Furthermore, derivatives of the above-mentioned monomers in which a hydrogen atom is replaced with a halogen atom may also be used.

In particular, as the radical polymerizable monomers, for example, common compounds, such as acryloyl morpholine, phenoxyethyl acrylate, isobornyl acrylate, 2-hydroxypropyl acrylate, 2-ethylhexyl acrylate, 1,6-hexanediol diacrylate, tripropylene glycol diacrylate, neopentyl glycol PO modified diacrylate, 1,9-nonandiol diacrylate, hydroxypivalic acid neopentyl glycol diacrylate, acrylic acid ester, fluorene acrylate, urethane acrylate, octylfluorene, and benzyl acrylate, may be used. These compounds mentioned above each may be a mono-functional or a multifunctional compound.

In addition, as the cationic polymerizable monomers, any compounds including an epoxy group or a vinyl group may be used, and for example, common compounds, such as epoxy cyclohexyl methyl acrylate, fluorene epoxy, glycidyl acrylate, vinyl ether, and oxetane, may be used.

As the radical polymerizing photopolymerization initiator, for example, common compounds, such as 2,2-dimethoxy-1, 2-diphenylethane-1-one, 1-[4-(2-hydroxyethoxy)-phenyl]-2-hydroxy-2-methyl-1-propane-1-one, and bis(2,4,6-trimethylbenzoyl)-phenyl phosphine oxide, may be used.

As the cation generating photopolymerization initiator, for example, common compounds, such as diphenyliodonium hexafluorophosphate, tri-p-tolylsulfonium hexafluorophosphate, cumyltolyliodonium hexafluorophosphate, cumyltolyliodonium tetrakis(pentafluorophenyl)boron, may be used.

For example, when cationic polymerizable monomers and a cation generating photopolymerization initiator are used, cured shrinkage of the liquid material M1 can be decreased as compared to that in the case in which radical polymerizable monomers and a radical generating photopolymerization initiator are used. In addition, as a photo-polymerizing or a photo-crosslinking resin material, anionic polymerizable monomers and an anion generating photopolymerization initiator may also be used in combination.

As this photopolymerization initiator, a compound having a vaporizing temperature in the range of from 140° C. to 400° C. (in this case, 140° C. and 400° C. are both included in the above range, and hereinafter, the range is used in the same meaning as described above) is preferably used.

That is, the reason for this is that in the case of using a photopolymerization initiator having a low vaporizing temperature, when photopolymerization initiator residues present in the vicinity of a focus Fb are heated to an approximately vaporizing temperature or more by irradiation of recording light beams L2c, the above residues are vaporized, and as a result, a recording mark RM can be formed.

In addition, since the photopolymerization initiator residues are vaporized by heat generated by the irradiation of the recording light beams L2c, and a recording time by a photopolymerization initiator having a low vaporizing temperature actually tends to be shorter than that by a photopolymerization initiator having a high vaporizing temperature, it is also believed that as the vaporizing temperature of the photopolymerization initiator is decreased, the recording mark RM can be more easily formed.

However, it has been confirmed that by a general photopolymerization initiator, an endothermic reaction gradually starts from a temperature of approximately 90° C., which is lower than the vaporizing temperature by approximately 60° C. This phenomenon indicates that when the optical information recording medium 100 containing a photopolymerization initiator is stored at a temperature of approximately 90° C. for a long period of time, photopolymerization initiator residues are gradually vaporized and may not remain when the recording mark RM is to be formed, and that even when the recording light beams L2c are radiated, the recording mark RM may not be formed in some cases.

In general, an electronic device, such as an optical information recording/reproducing device 5, is supposed so as to be used at a temperature of approximately 80° C. Hence, in order to ensure temperature stability of the optical information recording medium 100, a photopolymerization initiator having a vaporizing temperature of 140° C. (80° C.+60° C.) or more is preferably used. In addition, it is believed that by using a photopolymerization initiator having a vaporizing temperature higher than 140° C. by approximately 5° C. (that is, 145° C.), the temperature stability can be further improved.

As described above, the vaporizing temperature of a photopolymerization initiator contained in the liquid material M1 is preferably in the range of 140° C. to 400° C. and more preferably in the range of 145° C. to 300° C.

In order to sufficiently advance a photo-polymerizing reaction and also to prevent negative effects, such as a decrease in elastic modulus of the recording layer 101, caused by excessive presence of photopolymerization initiator residues, the amount of the photopolymerization initiator is preferably 0.8 to 40.0 parts by weight and more preferably 2.5 to 20.0 parts by weight with respect to 100 parts by weight of monomers.

In addition, among photo-polymerizing monomers, photo-crosslinking monomers, and a photopolymerization initiator, in particular, when a material for the photopolymerization initiator is appropriately selected, a wavelength at which photopolymerization is likely to occur can be adjusted to a desired wavelength. In addition, the liquid material M1 may also contain appropriate amounts of various additives, such as a polymerization inhibitor that prevents reaction from starting caused by unexpected light and a polymerization promoter that promotes polymerization reaction.

Figure 2:
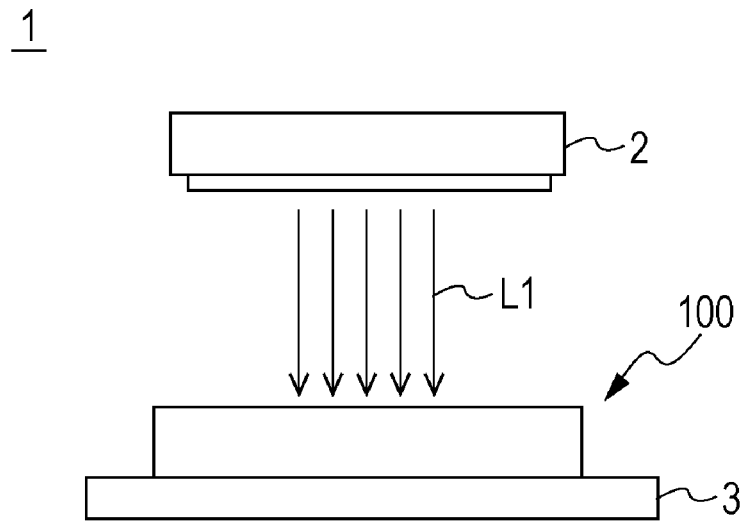
FIG. 2 is a schematic view illustrating irradiation of initializing light.

In addition, in the uncured optical information recording medium 100a, when being irradiated with initializing light L1 emitted from an initializing light source 2, the liquid material M1 is initialized in an initializing device 1 shown in FIG. 2 so as to function as the recording layer 101 recording a recording mark.

In particular, the initializing device 1 is designed so as to emit the initializing light L1 (such as a DC (direct current) output of 300 mW/cm$^2$) having a wavelength, for example, of 365 nm from the initializing light source 2 to irradiate the uncured and plate-shaped optical information recording medium 100a placed on a table 3. The wavelength and the optical power of this initializing light L1 are appropriately optimized in consideration of the type of photopolymerization initiator used for the liquid material M1 and a thickness t1 of the recording layer 101.

For example, as the initializing light source 2, a light source capable of radiating high power, such as a high-pressure mercury lamp, a high-pressure metal-halide lamp, a solid-state laser, a xenon lamp, or a semiconductor laser, may be used.

In addition, the initializing light source 2 has a drive portion (not shown in the figure), is able to freely move in an X direction (horizontal direction in FIG. 2) and a Y direction (direction perpendicular to the plane of FIG. 2), and is also able to uniformly irradiate the uncured optical information recording medium 100a with the initializing light L1 from an appropriate position, so that the entire uncured optical information recording medium 100a is uniformly irradiated with the initializing light L1.

At this stage, radicals or cations are generated from the photopolymerization initiator contained in the liquid material M1 to start a photo-polymerizing reaction, a photo-crosslinking reaction, or both reactions of monomers (hereinafter collectively referred to as a "photoreaction") and also to advance the photo-polymerizing reaction and the photo-crosslinking reaction of monomers in a chain reaction manner. As a result, since the monomers are polymerized to form photopolymers, curing occurs, so that the recording layer 101 is formed.

Since the photoreaction almost uniformly occurs in this liquid material M1 as a whole, the refractive index of the recording layer 101 obtained by curing is uniform. That is, even when light is radiated on any position of the initialized optical information recording medium 100, the amount of returned light is constant, and hence information is not recorded in the optical information recording medium 100 at all.

In addition, for the recording layer 101, a heat-polymerizing resin material to be polymerized by heat or a heat-crosslinking resin material to be cross-linked by heat (hereinafter referred to as "heat-curing resin") may also be used. As the liquid material M1 which is a heat-curing resin in a non-cured state, for example, monomers and a curing agent or a heat-curing initiator are uniformly dispersed. Since the monomers are polymerized or cross-linked (hereinafter referred to as "heat curing") at a high temperature or room temperature, the liquid material M1 is changed into a polymer, and concomitant with this change, the refractive index and the reflectance are also changed.

In practice, the liquid material M1 is formed, for example, by adding a predetermined amount of the above photopolymerization initiator to a curing agent and heat-curable monomers forming a polymer. For example, as the heat-curable monomers and the curing agent, materials which are to be cured at room temperature or a relatively low temperature are preferably used so as not to vaporize the photopolymerization initiator. In addition, before the photopolymerization initiator is added, the heat-curing resin may be cured by heating in advance.

As the monomers used for a heat-curing resin, common monomers may be used. For example, various monomers used as materials for a phenol resin, a melamine resin, a urea resin, a polyurethane resin, an epoxy resin, an unsaturated polyester resin may be used.

In addition, as the curing agent used for a heat-curing resin, common curing agents may be used. For example, various curing agents, such as an amine, a polyamide resin, an imidazole, a polysulfide resin, and an isocyanate, may be used, and may be appropriately selected in accordance with a reaction temperature and properties of monomers. In addition, various additives, such as a curing promoter promoting a curing reaction, may also be used.

In addition, as the recording layer 101, a thermoplastic resin material may also be used. In this case, the liquid material M1 spread on the substrate 103 is formed, for example, by adding a predetermined amount of the above photopolymerization initiator to a polymer diluted with a predetermined diluting solvent.

In addition, as the thermoplastic resin material, common resins may be used. For example, various resins, such as an olefin resin, a vinyl chloride resin, a polystyrene, an acrylonitrile butadiene styrene copolymer (ABS), a poly(ethylene terephthalate), an acrylic resin, a poly(vinyl alcohol), a vinylidene chloride resin, a polycarbonate resin, a polyamide resin, an acetal resin, and a norbornene resin, may be used.

In addition, as the diluting solvent, various solvents, such as water, an alcohol, a ketone, an aromatic solvent, a halogenated solvent, and a mixture thereof, may be used. In addition, various additives, such as a plasticizer changing physical properties of a thermoplastic resin, may also be added.

The recording layer 101 preferably has a thickness of 0.05 to 1.0 mm. For example, the total thickness of the substrate 102 transmitting light and the recording layer 101 is preferably set to 1.0 mm or less. The reason for this is that in the case in which the thickness is more than 1.0 mm, the astigmatism of the recording light beams L2c generated in the optical information recording medium 100 is increased when the surface thereof is inclined.

(2) PRINCIPLE OF RECORDING AND REPRODUCING RECORDING MARK ACCORDING TO EMBODIMENT OF THE PRESENT INVENTION

In the case in which a photo-curing resin is used as the liquid material M1, since a photopolymerization initiator functions as a starter, and a photoreaction then proceeds in a chain reaction manner, only a very small amount of the photopolymerization initiator is consumed from a theoretical point of view. However, in order to rapidly and sufficiently advance the photoreaction of the liquid material M1, in general, an excessive amount of the photopolymerization initiator is contained as compared to the amount thereof which is actually consumed.

Figure 3:
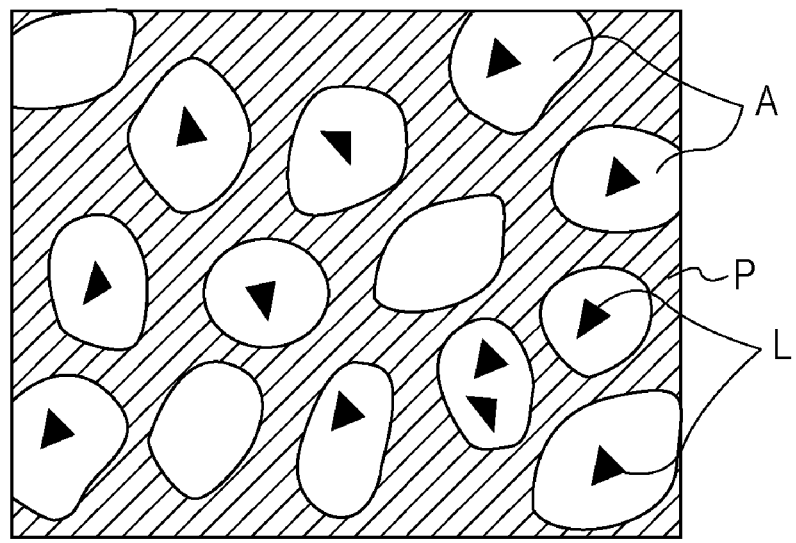
FIG. 3 is a schematic view showing photopolymerization initiator residues.

That is, as shown in FIG. 3, in the recording layer 101 of the initialized optical information recording medium 100, an unconsumed photopolymerization initiator (hereinafter referred to as "photopolymerization initiator residues") L is dispersed in spaces A formed in a polymer generated by polymerization of monomers. In addition, it can also be estimated that unreacted monomers that remain after a curing treatment may be dispersed in the recording layer 101 in some cases. When a heat-curing resin or a thermoplastic resin is used as a liquid material, since the photopolymerization initiator is not consumed, the photopolymerization initiator residues L are dispersed in the recording layer 101 as in the case described above.

In the optical information recording medium 100 according to an embodiment of the present invention, since a vaporizing material, such as a photopolymerization initiator, a solvent, or monomers, that is vaporized when it is boiled or decomposed at a temperature in the range of from 140° C. to 400° C. (in this case, 140° and 400° are included in the above range, and hereinafter, the range is used in the same meaning as described above), is contained in the liquid material M1, a vaporizing material having a vaporizing temperature of 140° C. to 400° C. is dispersed in the initialized recording layer 101.

Figure 4A:
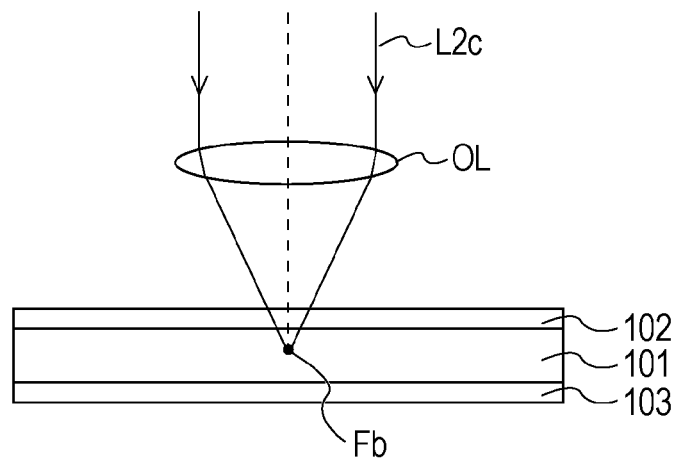
FIGS. 4A to 4C are schematic views each illustrating irradiation of light beams.
Figure 4B:
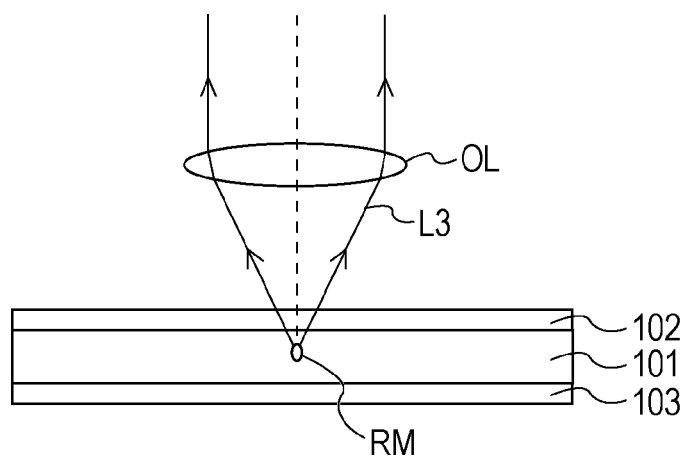
Figure 4C:
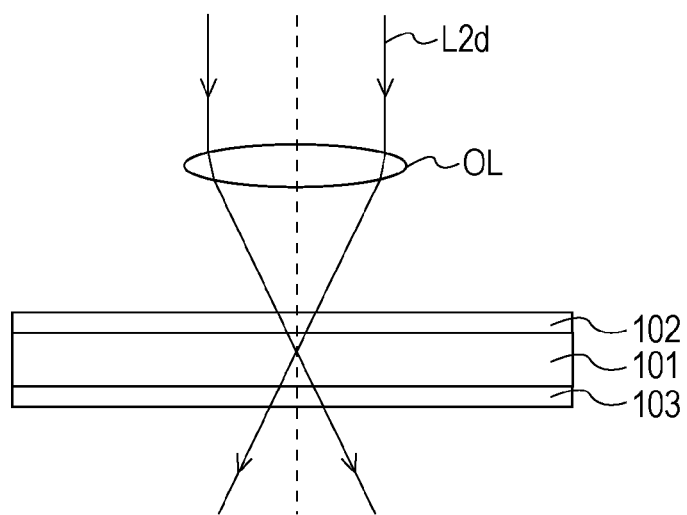

As shown in FIGS. 4A to 4C, when predetermined recording light beams L2 (hereinafter referred to as "recording light beams L2c") are radiated in the recording layer 101 through an object lens OL, the temperature in the vicinity of a focus Fb of the recording light beams L2c is locally increased to a high temperature, such as 140° C. or more.

At this stage, the recording light beams L2c vaporize the vaporizing material contained in the recording layer 101 in the vicinity of the focus Fb to increase its volume, so that an air bubble is formed at the focus Fb. The photopolymerization initiator residues vaporized at this time pass through the inside of the recording layer 101 or are cooled when the recording light beams L2c are not radiated and returns to a small volume liquid. As a result, in the recording layer 101, only a cavity formed by the air bubble remains in the vicinity of the focus Fb. In addition, it is believed that since a resin forming the recording layer 101 generally transmits air at a predetermined rate, the cavity is eventually filled with air.

That is, in the optical information recording medium 100, since the vaporizing material contained in the recording layer 101 is vaporized by irradiation of the recording light beams L2c, the recording mark RM, which is a cavity made of an air bubble, can be formed at the focus Fb as shown in FIG. 4A.

In general, since a refractive index $n_{101}$ of a photopolymer used for the recording layer 101 is approximately 1.5, and a refractive index $n_{AIR}$ of air is 1.0, when reading light beams L2d are radiated to the recording mark RM, due to the difference in refractive index at the interface of the recording mark RM, as shown in FIG. 4B, the recording layer 101 reflects the reading light beams L2d and generates returned light beams L3 having a relatively large light amount.

In addition, when the reading light beams L2 (hereinafter referred to as "reading light beams L2d") are radiated to a predetermined target position at which the recording mark RM is not recorded, since the vicinity of the target position has the refractive index $n_{101}$, which is the same index as that of the target position, the reading light beams L2d are not reflected as shown in FIG. 4C.

That is, in the optical information recording medium 100, the reading light beams L2d are radiated to a target position of the recording layer 101, and the light amount of the returned light beams L3 reflected by the optical information recording medium 100 is detected, so that the presence of the recording mark RM in the recording layer 101 can be detected, and information recorded in the recording layer 101 can be reproduced.

(3) LIGHT ABSORPTION PROPERTIES OF RECODING LAYER

The recording layer 101 of the optical information recording medium 100 is designed such that when heating is performed at 100° C. or more for a predetermined time (such as 1 minute or more), the light absorption properties are changed. That is, the recording layer 101 is formed such that the light absorption amount at the wavelength of the recording light beams L2c after heating is large as compared to that before heating.

For example, when heating is performed at 120° C. for 2 minutes for the optical information recording medium 100 in which the recording layer 101 has a thickness t1 of 250 μm, the change in light absorption amount before and after heating (hereinafter referred to as "heat absorption change amount") is preferably 6.0% or more and more preferably 12.0% or more.

This heat absorption change amount is proportional to the thickness t1 of the recording layer 101. Hence, the heat absorption change amount calculated per 0.1 mm thickness of the recording layer 101 is preferably 2.4% or more and more preferably 4.8% or more.

Accordingly, when the vicinity of the focus Fb is heated in response to the irradiation of the recording light beams L2c, the recording layer 101 can increase the amount of heat generation by improving the light absorption amount in the vicinity of the focus Fb, so that the recording mark RM made of an air bubble can be formed within a short period of time by rapidly increasing the temperature in the vicinity of the focus Fb.

In particular, by selection of a material used for the liquid material M1, the recording layer 101 contains a material in which the light absorption amount at the wavelength of the recording light beams L2c is changed by heating. As the material in which the light absorption amount is changed, an acid generator generating an acid and a compound (hereinafter referred to as "acid-reactive compound") which is modified by an acid and heat to have properties of increasing the light absorption amount with respect to the recording light beams L2c are preferably used in combination.

That is, since the liquid material M1 contains an acid-reactive compound and an acid generator, the acid-reactive compound and the acid generator are dispersed in the recording layer 101.

In the recording layer 101, when the condensed recording light beams L2c are radiated, the vicinity of the focus Fb is heated by heat generated by the recording light beams L2c. At this stage, an acid generated from the acid generator is present at the focus Fb.

As a result, the recording layer 101 modifies the acid-reactive compound, so that the light absorption amount of the modified acid-reactive compound with respect to the recording light beams L2c can be improved. In addition, since the modified acid-reactive compound effectively absorbs the recording light beams L2c and generates heat, the photopolymerization initiator or the monomers dispersed in the recording layer 101 are rapidly vaporized, so that the time forming a cavity as the recording mark RM in the recording layer 101 can be shortened.

As the acid generator, either a proton acid generating a proton or a Lewis acid receiving an electron may be used. In particular, as the acid generator, for example, a strong acid compound, such as $H_2SO_4$ or HCl; an acid having a high acid strength, such as $RB(C_6F_5)_4$, $RSbF_6$, $RPF_6$, or $RBF_4$ (R indicates a general formula); or a compound generating an acid having a high acid strength may be preferably used. The reason for this is that since the above acid generator can more rapidly modify an acid-reactive compound, the recording light beams L2c are rapidly absorbed, and heat is generated. Incidentally, the acid generators mentioned above each may be present in the state in which its acid is separated or is not separated. As this acid generator, a Lewis acid compound generating a Lewis acid may also be used.

In addition, as the acid generator, a cation generating photopolymerization initiator generating an acid in response to heat or light having a wavelength of the recording light beams L2c is preferably used. The reasons for this are that cations are generated in response to the irradiation of the recording light beams L2c, and in addition, when the recording light beams L2c are not radiated, the above photopolymerization initiator does not function as an acid and can prevent degradation of the recording layer 101 caused by an acid.

As this acid generator, in particular, a compound which generates an acid having a high acid strength is preferably used.

Hereinafter, general acids are shown in accordance with the order of acid strength. In the order described below, ">>" indicates a significant difference in acid strength.

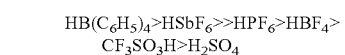

That is, as the acid generator, a compound having a higher acid strength is preferably used, and in particular, compounds generating anion species, such as $B(C_6H_5)_4^-$ and $SbF_6^-$, as shown by the following general formulas (2) to (5) are preferably used. Furthermore, in particular, since antimony, which has a high toxicity, is not contained, a compound (for example, represented by the general formula (2)) generating $B(C_6H_5)_4^-$ is preferably used. Alternatively, a Lewis acid compound represented by the following general formula (3) may also be contained.

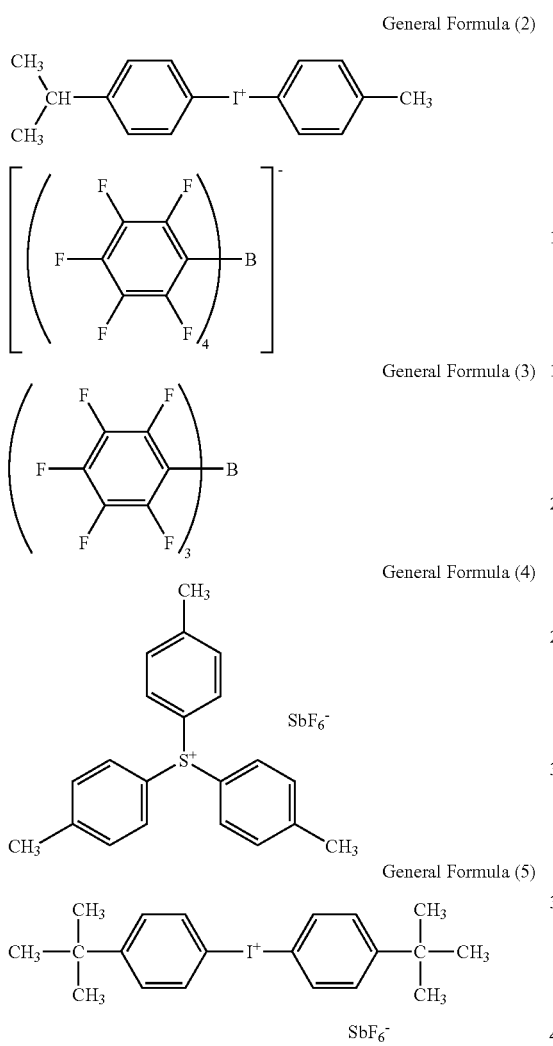

General Formula (2)

General Formula (3)

General Formula (4)

General Formula (5)

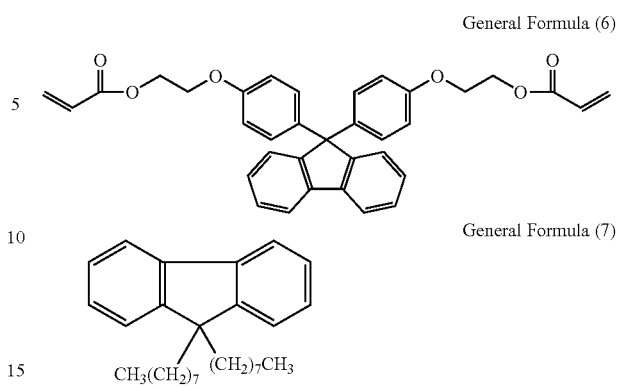

General Formula (6)

General Formula (7)

The recording layer 101 may contain an appropriate amount of an acid generator in accordance with its acid strength. In the liquid material M1, with respect to 100 parts by weight of the monomers, the acid generator is contained preferably in an amount of 0.7 parts by weight or more and more preferably in an amount of 1.0 part by weight or more. The reasons for this are that an acid-reactive compound can be modified within a short period of time, and that the recording time can be shortened.

When a cation generating photopolymerization initiator is used as the liquid material M1, as the monomers, cation polymerizable monomers may be use; however, cation polymerizable monomers may not be used in some cases.

In addition, as the acid-reactive compound, a compound to be rapidly modified by an acid generator and heat is preferably used and may also be contained as part or most of monomers to be polymerized by initialization. In this case, a polymer formed by polymerization by the initialization and/or remaining monomers which are not polymerized function as the acid-reactive compound.

As the acid-reactive compound, for example, a compound having a fluorene structure represented by the general formula (1) is preferably used.

Examples of the compound having a fluorene structure are shown by the following general formulas (6) and (7).

As one example of the compound having a fluorene structure, when a compound having an acrylic functional group, such as an EO (ethylene oxide) modified phenylfluorene compound represented by the general formula (6), is used as the acid-reactive compound, this acid-reactive compound may be used as part or all of monomers to be polymerized by a photoreaction. This acid-reactive compound may also have various functional groups, such as an epoxy group and an ester group, as well as an acrylic group.

In addition, by using a compound having no functional group as shown by the general formula (7) as the acid-reactive compound, the acid-reactive compound may be used by adding to monomers. In addition, when the compound is solid, the compound may also be used in a manner similar to that for a thermoplastic resin.

For example, as the acid-reactive compound, a compound may also be used which has a large heat absorption change amount and which also has properties of increasing the light absorption amount as compared to that before irradiation when light having a wavelength of the recording light beams L2c is radiated at a predetermined intensity or more. The reasons for this are that the light absorption amount of the whole recording layer 101 can be increased in response to light energy as well as heat energy, and that by this synergistic effect of light and heat, the recording time can be significantly shortened.

As described above, in the optical information recording medium 100, by selection of a material used for the liquid material M1, the recording layer 101 is formed so as to improve the light absorption amount thereof with respect to the recording light beams L2c by heating.

As a result, in the recording layer 101, since the light absorption amount in the vicinity of the focus Fb is increased in response to the irradiation of the recording light beams L2c, the temperature in the vicinity of the focus Fb is rapidly increased, so that the recording mark RM made of an air bubble can be formed within a short period of time.

(4) EXAMPLES (4-1) Example 1

(4-1-1) Formation of Samples

Samples S1 to S4 were each formed as the optical information recording medium 100 under the following conditions. In addition, as comparative samples, Comparative Samples R1 to R4 were each also formed as the optical information recording medium 100.

Four types of photopolymerization initiators (shown below) used in Example 1 are represented by photopolymerization initiators A, B, D, and E. In addition, as the acid generator, besides the photopolymerization initiators, a Lewis acid compound C was also used. As the polymerization initiators and the Lewis acid compound, commercially available compounds were used. Since the polymerization initiators and the Lewis acid compound were commercially available compounds, various additives might also be contained in some cases besides the compounds shown below.

Photopolymerization initiator A: cumyltolyliodonium tetrakis(pentafluorophenyl)borate (General Formula (2))

Photopolymerization initiator B: tri(p-tolylsulfonium hexafluoroantimonate (General Formula (4))

Lewis acid compound C: tri(pentafluorophenyl)boron (General Formula (3))

Photopolymerization initiator D: bis(t-butyl phenyl)iodonium hexafluorophosphate (General Formula (8))

Photopolymerization initiator E: 2-hydroxy-2-methyl-1-phenyl-propane-1-one (General Formula (9) shown below)

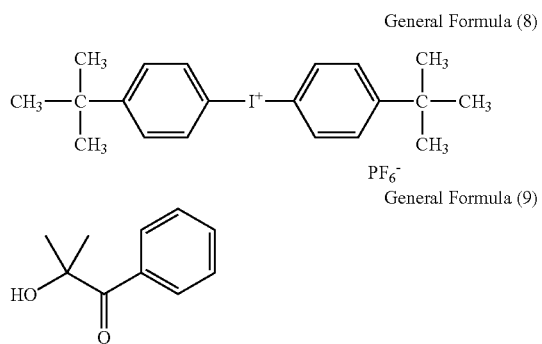

General Formula (8)

General Formula (9)

After the photopolymerization initiator was added to 100 parts by weight of monomers, mixing and defoaming were performed in a dark room, so that the liquid material M1 was prepared.

The amounts of the monomers and the photopolymerization initiator forming the liquid material M1 for each of Samples S1 to S4 and Comparative Samples R1 to R4 are shown in the following table. The photopolymerization initiators A, B, and D were each a cation generating polymerization initiator generating an acid and were blended as an acid generator. The Lewis acid compound C was also blended as an acid generator as with the above photopolymerization initiators.

The acrylic acid ester is a p-cumylphenol ethylene oxide adduct acrylate (general formula (10)) shown below, and the fluorene difunctional acrylate is a diphenylfluorene EO modified diacrylate (general formula (6)).

General Formula (10)

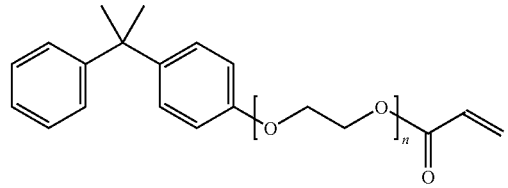

The liquid material M1 was spread on the substrate 103 and was then sandwiched between the substrates 102 and 103, so that the uncured optical information recording medium 100a was formed. This uncured optical information recording medium 100a was irradiated with the initializing light L1 (having a power density of 42 mW/cm² at a wavelength of 365 nm) for 60 seconds using a first initializing light source 1 formed of a high-pressure mercury lamp, so that Samples S1 to S4 and Comparative Samples R1 to R4 each used as the optical information recording medium 100 were formed. The thickness t1 of the recording layer 101 of each of Samples S1 to S4 and Comparative Samples R1 to R4 was 250 μm.

(4-1-2) Measurement of Heat Absorption Change Amount

Next, the heat absorption change amount of each of Samples S1 to S4 and Comparative Samples R1 to R4 each used as the optical information recording medium 100 was measured.

First, the light absorption amount of the optical information recording medium 100 was measured using a spectral photometer. In particular, first, the optical information recording medium 100 was placed to be inclined by 5° with respect to a light emission direction of a spectral photometer (V560 manufactured by JASCO Corporation) and was then irradiated with measurement light, and the reflectance and the transmittance of the measurement light with respect to this optical information recording medium 100 were measured at each wavelength.

Subsequently, the irradiation amount of the measurement light was assumed to be 100%, and the reflectance and the transmittance of the measurement light with respect to this

TABLE 1

| | SAMPLE | S1 | S2 | S3 | S4 | R1 | R2 | R3 | R4 |
|---|---|---|---|---|---|---|---|---|---|
| MONOMER | ACRYLIC ACID ESTER | 40 | 40 | 40 | 40 | 40 | 40 | 40 | 40 |
| | FLUORENE DIFUNCTIONAL ACRYLATE | 60 | 60 | 60 | 60 | 60 | 60 | — | — |
| | URETHANE DIFUNCTIONAL ACRYLATE | — | — | — | — | — | — | 60 | 60 |
| PHOTOPOLYMERIZATION INITIATOR/LEWIS ACID COMPOUND | A | 1 | 5 | — | — | 0.6 | — | — | — |
| | B | — | — | 10 | — | — | — | — | — |
| | C | — | — | — | 5 | — | — | — | — |
| | D | — | — | — | — | — | 10 | — | 1 |
| | E | 1 | 1 | 1 | 1 | 1 | 1 | 1 | 20 | optical information recording medium 100 were subtracted from 100%, so that the amount of absorption light of the optical information recording medium 100 which was not heated (hereinafter referred to as "light absorption amount before heating") was obtained.

Next, the optical information recording medium 100 was heated. In particular, the optical information recording medium 100 was placed on a heating plate at room temperature (in the range of 20° C. to 50° C.) and was then heated to 120° C. at a rate of 10° C./minute. Subsequently, the optical information recording medium 100 was heated while the heating plate was maintained at 120° C. for 2 minutes and was then cooled to room temperature (23° C.). Hereinafter, the optical information recording medium 100 thus heated was called a heated optical information recording medium 100H and was discriminated from the optical information recording medium 100 which was not heated.

The light absorption amount of this heated optical information recording medium 100H was measured in a manner similar to that for the optical information recording medium 100, so that a light absorption amount after heating was measured. Next, a heat absorption change amount at a wavelength of 405 nm was calculated by subtracting the light absorption amount before heating at a wavelength of 405 nm from the light absorption amount after heating at a wavelength of 405 nm. The heat absorption change amounts of the optical information recording media 100 (of Samples S1 to S4 and Comparative Samples R1 to R4) are shown below.

TABLE 2

| SAMPLE | HEAT ABSORPTION CHANGE AMOUNT AT 405 nm [%] |
| --- | --- |
| S1 | 17.5 |
| S2 | 37.0 |
| S3 | 22.0 |
| S4 | 12.0 |
| R1 | 5.7 |
| R2 | −0.3 |
| R3 | −2.5 |
| R4 | −2.8 |

As apparent from Table 2, according to all Samples S1 to S4, the heat absorption change amount showed a high value of 12.0% or more. On the other hand, according to all Comparative Samples R1 to R4, the heat absorption change amount showed a low value of 5.7% or less.

Figure 5:
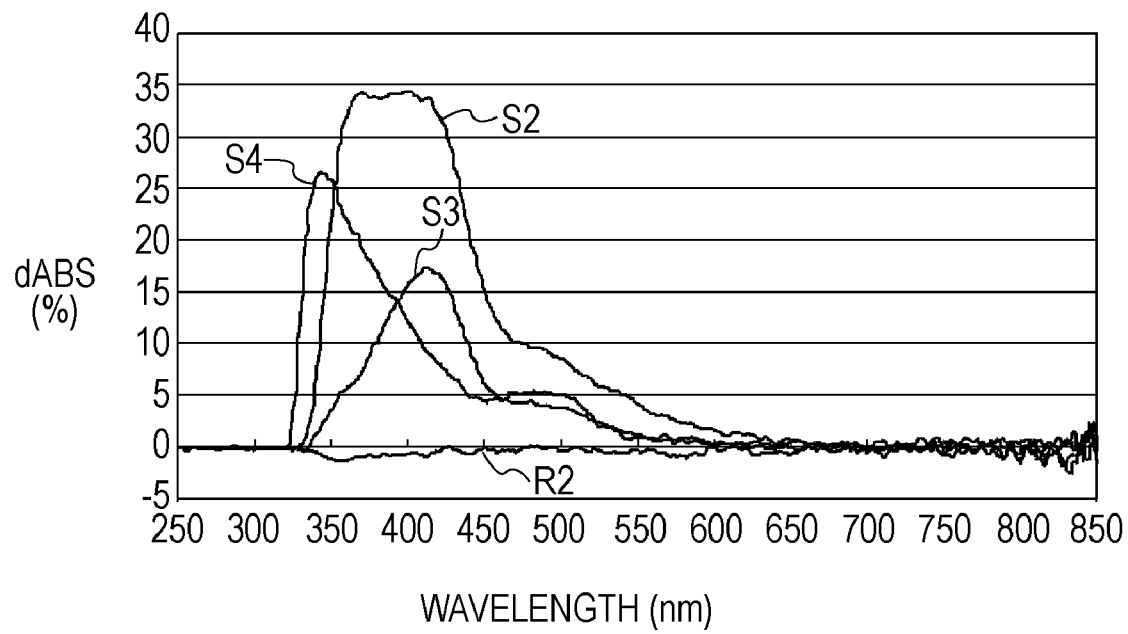
FIG. 5 is a graph showing the change in light absorption amount by heating with wavelength.

In addition, in FIG. 5, the heat absorption change amounts of Samples S2 to S4 and Comparative Sample R2 with respect to light having a wavelength of 330 to 800 nm are shown. As apparent from the figure, it was confirmed that according to Samples S2 to S4, the heat absorption change amount showed a relatively high value with respect to light having a wide wavelength range of 350 to 650 nm.

(4-1-3) Measurement of Vaporizing Temperature

Next, the vaporizing temperatures of the photopolymerization initiators and the Lewis acid compound used for Samples S1 to S4 and Comparative Samples R1 to R4 were measured using a thermal gravity-differential thermal analysis (TG/DTA). The measurement conditions are shown below.
Atmosphere: $N_2$ (in a nitrogen atmosphere)
Temperature rise rate: 20° C./minute
Measurement temperature: 40° C. to 600° C.
Measurement apparatus: TG/DTA 300 (manufactured by Seiko Instruments Inc.)

Figure 6:
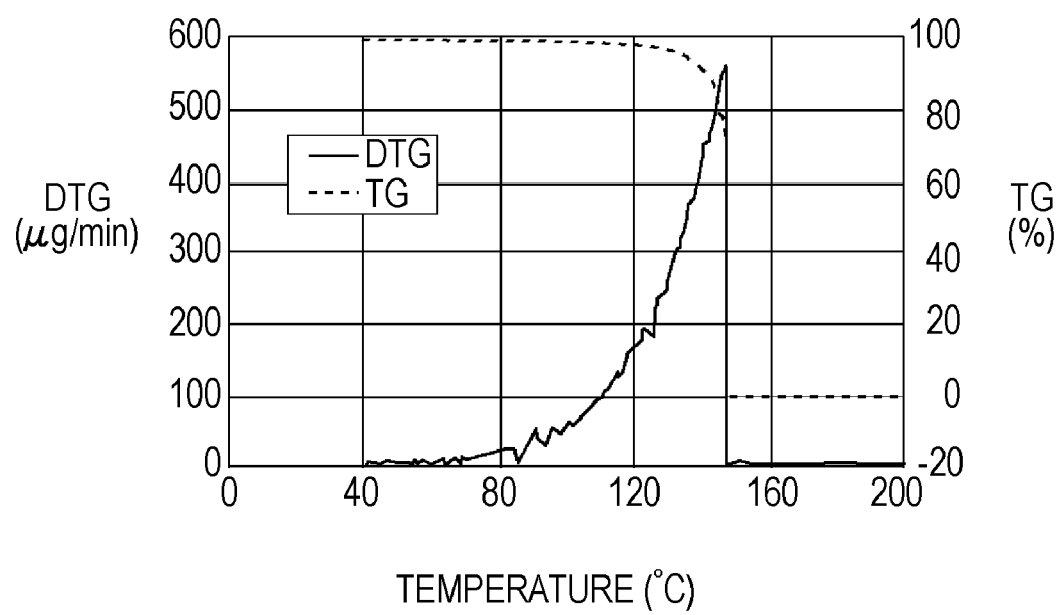
FIG. 6 is a graph used for illustrating measurement (1) of a vaporizing temperature.

FIG. 6 shows measurement results of the photopolymerization initiator E used for Samples S1 to S4 and Comparative Samples R1 to R4. According to the DTA curve (shown by the solid line) indicating an endothermic and an exothermic reaction, an exothermic reaction started slightly at approximately 90° C. and occurred vigorously at approximately 120° C.

In addition, according to the TG curve (shown by the dotted line) indicating the change in weight, the weight was rapidly decreased at approximately 120° C., and most of the photopolymerization initiator E, which was an object of the measurement, was vaporized at approximately 147° C. A temperature of 147° C. at which the weight was most rapidly decreased was regarded as the vaporizing temperature of the photopolymerization initiator E.

Figure 7:
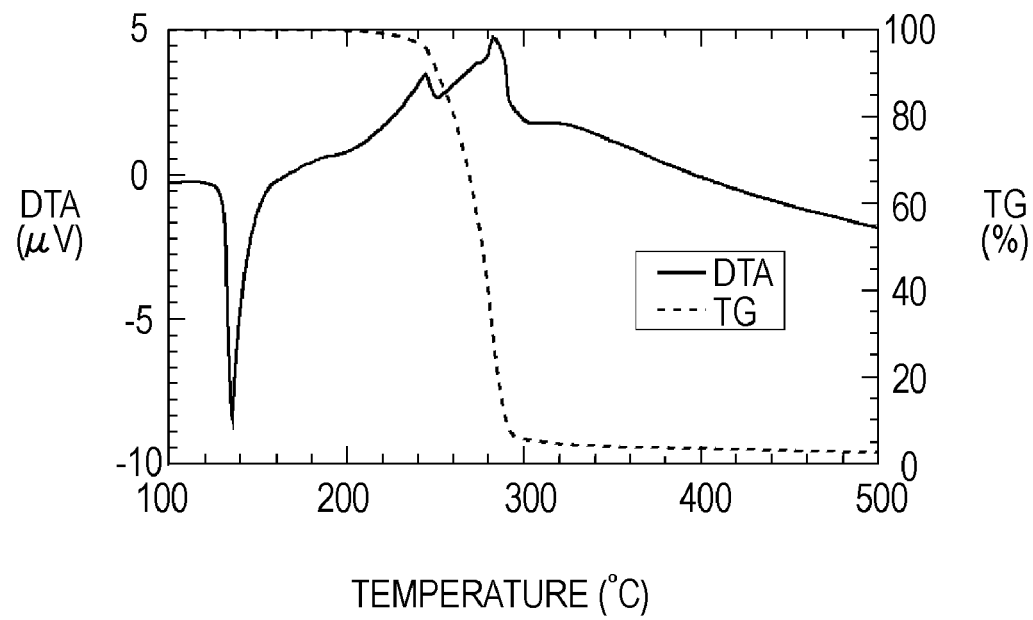
FIG. 7 is a graph used for illustrating measurement (2) of a vaporizing temperature.

FIG. 7 shows measurement results of the photopolymerization initiator A used for Samples S1 and S2 and Comparative Sample R1. According to the DTA curve, an endothermic reaction caused by melting or the like started at approximately 130° C., and an exothermic reaction caused by decomposition or the like started at approximately 230° C.

In addition, according to the TG curve (shown by the dotted line), the weight was rapidly decreased at approximately 230° C., and most of the photopolymerization initiator A, which was an object of the measurement, was vaporized at approximately 290° C. A temperature of 290° C. at which the weight was most rapidly decreased was regarded as the vaporizing temperature of the photopolymerization initiator A.

Figure 8:
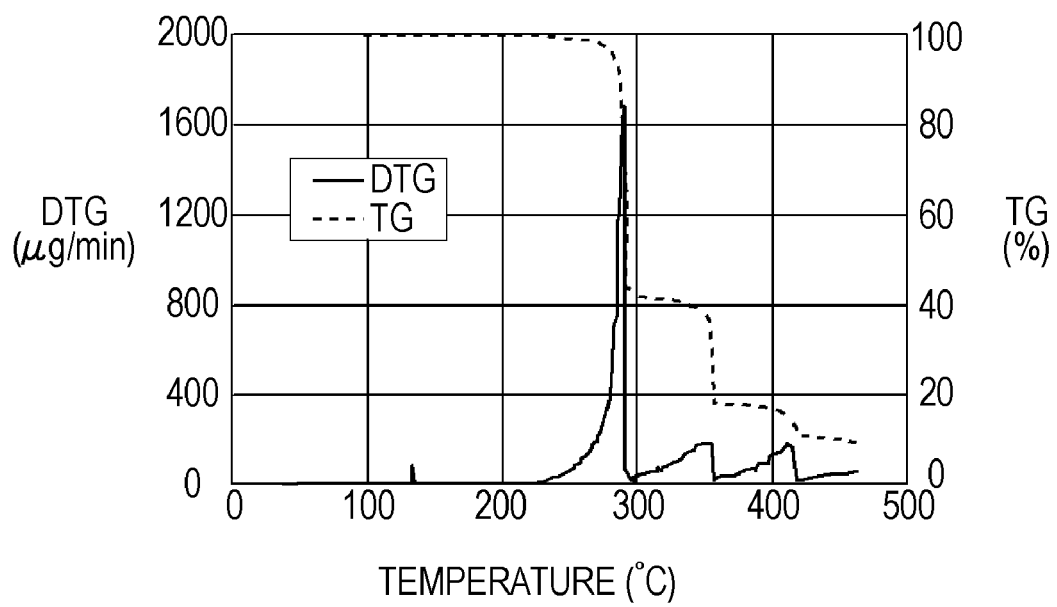
FIG. 8 is a graph used for illustrating measurement (3) of a vaporizing temperature.

Although not shown in the figure, the vaporizing temperatures of the other photopolymerization initiators B and D, and the Lewis acid compound C were also measured in a manner similar to that described above. For example, as shown in FIG. 8, when a measurement object had a plurality of vaporizing temperatures, a lowest temperature (289° C. in FIG. 7) at which the weight was rapidly decreased was regarded as the vaporizing temperature of the measurement object.

The vaporizing temperatures of the photopolymerization initiators thus measured are shown in the following Table.

TABLE 3

| PHOTOPOLYMERIZATION INITIATOR/LEWIS ACID COMPOUND | VAPORIZING TEMPERATURE [° C.] |
| --- | --- |
| A | 290 |
| B | 140 |
| C | 150 |
| D | 280 |
| E | 147 |

As apparent from the table, it was confirmed that all the photopolymerization initiators A, B, D, and E and the Lewis acid compound C had a vaporizing temperature in the range of 140 to 400° C.

Figure 9:
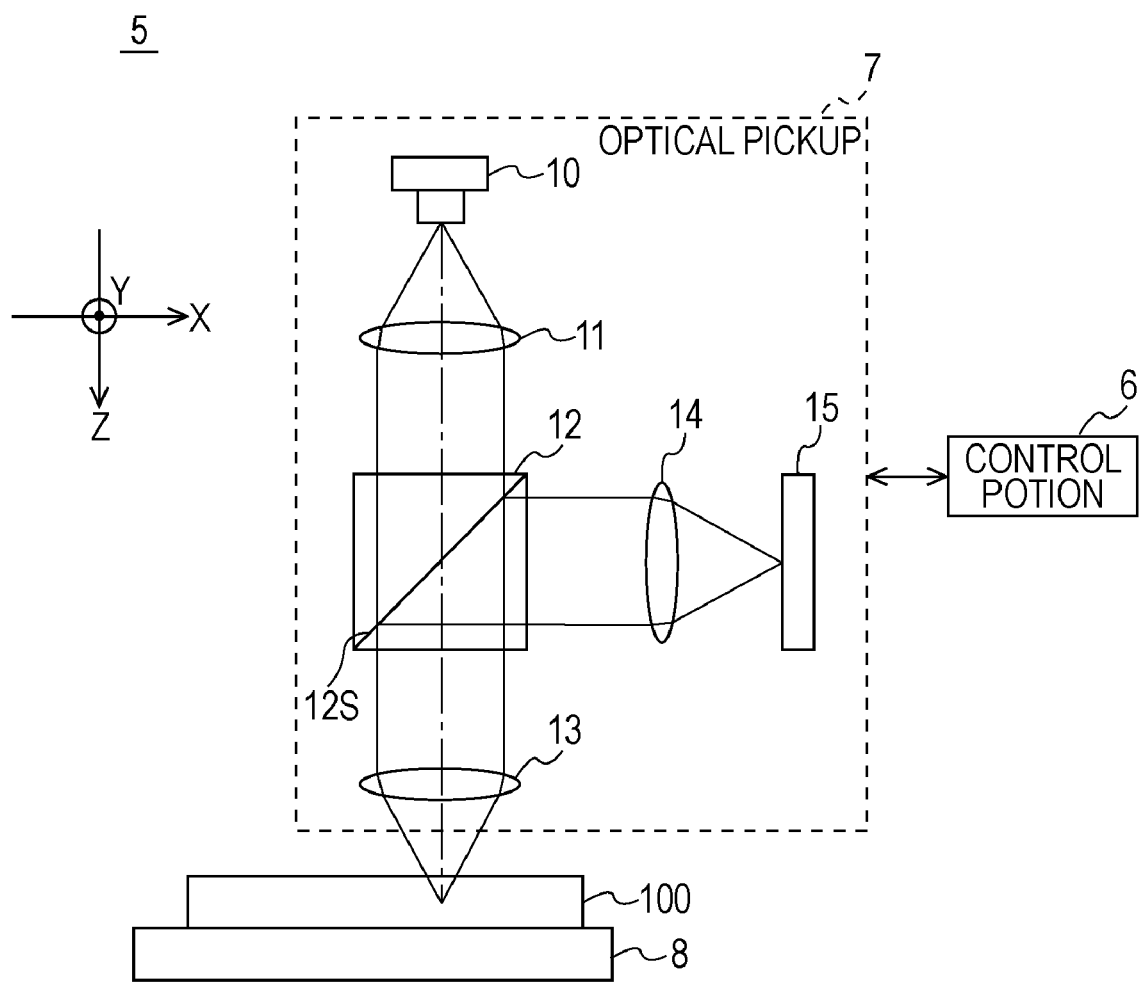
FIG. 9 is a schematic view showing the structure of an optical information recording/reproducing device.

(4-1-4) Formation and Reading of Recording Mark (4-1-4-1) Structure of Optical Information Recording/Reproducing Device As shown in FIG. 9, the optical information recording/reproducing device 5 is formed such a way that by radiating light to the whole recording layer 101 of the optical information recording medium 100, information is recorded in and reproduced from a plurality of recording mark layers (hereinafter referred to as "virtual recording mark layers) supposed in the recording layer 101.

In the optical information recording/reproducing device 5, a control portion 6 including central processing units (CPUs) is responsible for integral control of the whole device, and various programs, such as a basic program, an information recording program, and an information reproducing program, are read out from read only memories (ROMs) not shown in the figure and are then developed on random access memories (RAMs) not shown in the figure, so that various processes, such as an information recording process and an information reproducing process, are performed.

The control portion 6 is formed such that by controlling an optical pickup 7, light is radiated from the optical pickup 7 to the optical information recording medium 100, and light that returns from the optical information recording medium 100 is received.

The optical pickup 7 is formed in such a way that based on the control by the control portion 6, light beams L2 having a wavelength, for example, of 405 to 406 nm are emitted from a recording/reproducing light source 10 made of a laser diode at a DC output, and after being converted from divergent light to parallel light by a collimator lens 11, the light beams L2 are made incident on a beam splitter 12.

Incidentally, the recording/reproducing light source 10 is designed so as to be able to adjust the light amount of the light beams L2 in accordance with the control of the control portion 6.

The beam splitter 12 enables some of the light beams L2 to pass through a reflection/transmission surface 12S and to enter an object lens 13. The object lens 13 is formed so as to condense the light beams L2 at an arbitrary position in the optical information recording medium 100.

In addition, when returning from the optical information recording medium 100, the returned light beams L3 are converted into parallel light beams by the object lens 13 and then enter the beam splitter 12. At this stage, the beam splitter 12 enables some of the returned light beams L3 to enter a condenser lens 14 by reflection at the reflection/transmission surface 12S.

The condenser lens 14 condenses the returned light beams L3 and then radiates them to a receiving element 15. In response to this irradiation, the receiving element 15 detects the light amount of the returned light beams L3, generates a detection signal in accordance with this detected light amount, and then sends the detection signal to the control portion 6. The control portion 6 is designed to be able to recognize the detection state of the returned light beams L3 based on the detection signal.

In addition, the optical pickup 7 is provided with a drive portion not shown in the figure and is designed to freely move in three axis directions, an X direction, a Y direction, and a Z direction. In practice, by controlling the position of the optical pickup 7, the control portion 6 can set the focus position of the light beams L2 to a desired position.

As described above, the optical information recording/reproducing device 5 is formed so as to condense the light beams L2 on an arbitrary position in the optical information recording medium 100 and so as to detect the returned light beams L3 that return from the optical information recording medium 100.

(4-1-4-2) Measurement of Recording Rate

In particular, in the optical information recording/reproducing device 5, a target position is set at a depth of 25 to 200 µm from the surface of the recording layer 101, and the recording light beams L2c, that is, laser light having a wavelength of 405 to 406 nm and an optical power of 55 mW, is emitted from the recording/reproducing light source 10 and is condensed by the object lens 13 having a numerical aperture (NA) of 0.3 to irradiate the target position.

Figure 10A:
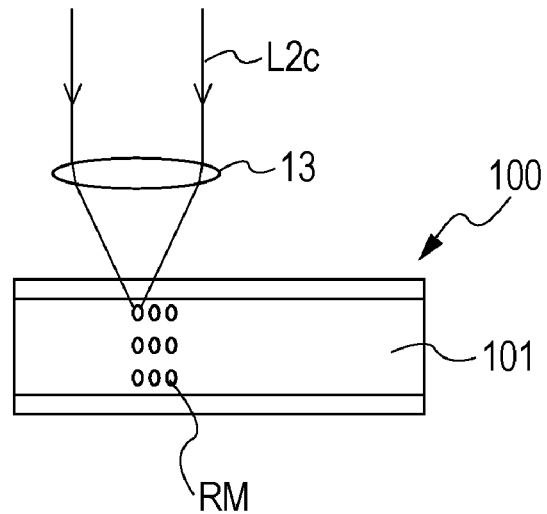
FIGS. 10A and 10B are schematic views illustrating recording and reproducing of information, respectively.
Figure 10B:
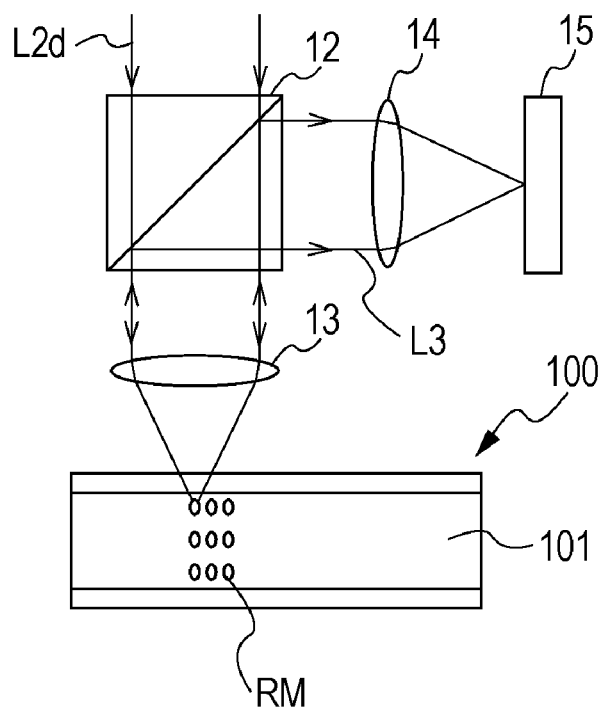

When information is read out from the optical information recording medium 100, as shown in FIG. 10B, the optical information recording/reproducing device 5 condenses the reading light beams L2d emitted from the recording/reading light source 10 (shown in FIG. 9) in the recording layer 101. In this case, the optical information recording/reproducing device 5 controls the position of the optical pickup 7 (shown in FIG. 9) in the X direction, the Y direction, and the Z direction, so that the reading light beams L2d (shown in FIG. 10B) is focused on the target position in the recording layer 101.

In this step, in the optical information recording/reproducing device 5, the reading light beams L2d having an optical power of 200 µW or 1.0 mW and the same wavelength as that of the recoding light beams L2c are emitted from the recording/reproducing light source 10 and are condensed by the object lens 13 on the target position in the recording layer 101 at which the recording mark RM is formed.

In this step, the reading light beams L2d are reflected by the recording mark RM and are converted into the returned light beams L3. The optical information recording/reproducing device 5 detects the returned light beams L3 by the receiving element 15 made of a charged coupled device (CCD) through the object lens 13, the beam splitter 12, and the like.

First, the optical information recording/reproducing device 5 radiated the recording light beams L2c having an optical power of 55 mW and a wavelength of 405 nm to the target position of Sample S1 through the object lens 13 having an NA of 0.3. At this stage, in order to measure the shortest recordable time, the time radiating the recording light beams L2c from the optical information recording/reproducing device 5 was first set to 1 millisecond and was then increased by 1 millisecond.

Next, the optical information recording/reproducing device 5 radiated the reading light beams L2d having an optical power of 1.0 mW and the same wavelength as that of the recording light beams L2c through the object lens 13. In this step, the receiving element 15 could detect the returned light beams L3 having a sufficient detectable light amount that returned from the location which was irradiated with the recording light beams L2c for 9 milliseconds. Hereinafter, the light amount in this step was regarded as a reference light amount, and the recording times for Samples S1 to S4 and Comparative Samples R1 to R4 were measured.

When the time radiating the recording light beams L2c on Sample S2 was increased by 1 millisecond, the returned light beams L3 could be detected when the irradiation was performed for 2 milliseconds, and hence the recording light beams L2c was first radiated for 1.0 millisecond and was then radiated for every 0.1 milliseconds so as to measure the recording time. The recording times of Samples S1 to S4 and Comparative Samples R1 to R4 are shown in the following table.

TABLE 4

| SAMPLE | RECORDING TIME [msec] | HEAT ABSORPTION CHANGE AMOUNT AT 405 nm [%] |
|---|---|---|
| S1 | 5.0 | 17.5 |
| S2 | 1.2 | 37.0 |
| S3 | 7.0 | 22.0 |
| S4 | 5.0 | 12.0 |
| R1 | 11.0 | 5.7 |
| R2 | 35.0 | −0.3 |
| R3 | 900.0 | −2.5 |
| R4 | 30.0 | −2.8 |

As apparent from the table, according to Samples S1 to S4 in which the heat absorption change amount showed a high value of 12.0% or more, all the recording times showed a low value of less than 10 milliseconds. On the other hand, in Comparative Samples R1 to R4 in which the heat absorption change amount showed a low value of 5.7% or less, all the recording times showed a high value of 11 milliseconds or more.

Since the recording time of Comparative Sample R1 was 11 milliseconds, which was slightly more than 10 milliseconds, in order to decrease the recording time to 10 milliseconds or less, the recording layer 101 is preferably formed so as to increase the heat absorption change amount to 6.0% or more and further to 12% or more.

In addition, as shown in Table 1, according to Samples S1 to S4 in which the photopolymerization initiators A to C generating $B(C_6H_5)_4^-$ and $SbF_6^-$ were used as the acid generator, the recording time showed a low value of 9 milliseconds or less. In addition, according to Comparative Sample R2 in which the photopolymerization initiator D generating $PF_6^-$ which had a relatively low acid strength was used as the acid generator, the recording time showed a high value of 30 milliseconds or more. Accordingly, it was found that the acid generated from the acid generator preferably had a high acid strength.

Furthermore, although the photopolymerization initiator A was used as an acid generator for both Sample S1 and Comparative Sample R1, 1.0 part by weight of the photopolymerization initiator A was blended with 100 parts by weight of the monomers in Sample S1, and in Comparative Sample R1, 0.6 part by weight of the photopolymerization initiator A was blended with 100 parts by weight of the monomers.

According to Comparative Sample R1, since the recording time showed a high value of 11 milliseconds as compared to that of Sample S1, it was found that the 1.0 part by weight or more of the acid generator was preferably added to 100 parts by weight of the monomers.

(4-2) Example 2

(4-2-1) Formation of Samples

In a manner similar to that in Example 1, Samples S11 to S14 were formed as the optical information recording medium 100. In addition, as comparative samples, Comparative Samples R11 to R13 were also formed as the optical information recording medium 100.

In Example 2, besides the photopolymerization initiators A, D, and E used in Example 1, one type of photopolymerization initiator (shown below) was used and was referred to as a photopolymerization initiator F.

Photopolymerization initiator F: bis(t-butyl phenyl)iodonium hexafluoroantimonate (General Formula (5))

In addition, a fluorene difunctional epoxy is a monomer having the fluorene structure shown by the general formula (1) and two functional epoxy groups (EX1020 manufactured by Osaka Gas Chemicals Co., Ltd.).

In the following table, monomers, photopolymerization initiators, and the amounts thereof used for the liquid materials M1 of Samples S11 to S14 and Comparative Samples R11 to R13 are shown. By the way, Sample S1 and Comparative Sample R3 have the same compositions as those shown in Example 1.

TABLE 5

| | | SAMPLE | | | | | | | | |
|---|---|---|---|---|---|---|---|---|---|---|
| | | S1 | S11 | S12 | S13 | S14 | R3 | R11 | R12 | R13 |
| MONOMER | ACRYLIC ACID ESTER | 40 | 40 | 40 | 40 | — | 40 | 40 | — | 40 |
| | BENZYL METHACRYLATE | — | — | — | — | — | — | — | 40 | — |
| | FLUORENE DIFUNCTIONAL ACRYLATE | 60 | — | 60 | 60 | — | — | — | 60 | — |
| | FLUORENE DIFUNCTIONAL EPOXY | — | 60 | — | — | — | — | 60 | — | — |
| | URETHANE DIFUNCTIONAL ACRYLATE | — | — | — | — | — | 60 | — | — | — |
| | OCTYLFLUORENE | — | — | — | — | 5 | — | — | — | — |
| | BENZYL ACRYLATE | — | — | — | — | 95 | — | — | — | 60 |
| PHOTOPOLYMERIZATION INITIATOR | A | 1 | 1 | — | — | 10 | — | 0.6 | — | — |
| | D | — | — | 1 | — | — | — | — | — | — |
| | F | — | — | — | 1 | — | — | — | — | — |
| | E | 1 | — | 1 | 1 | 1 | 1 | — | 0.8 | 20 |

(4-2-2) Measurement of Change in Light Absorption Amount

In this example, for Samples S1 and S11 to S14 and Comparative Samples R3 and R11 to R13 each formed as the above optical information recording medium 100, the change in light absorption amount (hereinafter referred to as "light absorption change amount") of the optical information recording medium 100 before and after irradiation of light having a wavelength of 405 nm, which was the same wavelength as that of the recording light beams L2c, was measured.

First, the light absorption amount of the optical information recording medium 100 was measured by a spectral photometer in a manner similar to that in Example 1, and the light absorption amount of the optical information recording medium 100 before the irradiation of the light (hereinafter referred to as "light absorption amount before irradiation) was obtained.

Next, the light was radiated to the optical information recording medium 100. In particular, light having a wavelength of 405 nm emitted from a semiconductor laser was shaped by an anamorphic prism, and only part having a high output was extracted by an iris. Furthermore, the light thus extracted converted into parallel light by a collimator lens and was then radiated perpendicularly to the optical information recording medium 100 for 600 seconds. The diameter of the light radiated on the optical information recording medium 100 was 2.3 mm, the light intensity of the light thus radiated was 55 mW, and the irradiation energy thereof was 800 mJ/cm$^2$.

Hereinafter, the optical information recording medium 100 irradiated with the light is called a light-irradiated optical information recording medium 100B and is discriminated from the optical information recording medium 100 which is not irradiated with the light.

The light absorption amount of this light-irradiated optical information recording medium 100B was measured in a manner similar to that for the optical information recording medium 100, so that a light absorption amount after irradiation was measured. Subsequently, by subtracting the light absorption amount before irradiation at a wavelength of 405 nm from the light absorption amount after irradiation at a wavelength of 405 nm, the light absorption change amount at a wavelength of 405 nm was obtained. The light absorption change amount of each optical information recording medium 100 (each of Samples S1 and S11 to S14 and Comparative Samples R3 and R11 to R13) at a wavelength of 405 nm is shown in the following table.

TABLE 6

| SAMPLE | LIGHT ABSORPTION CHANGE AMOUNT AT 405 nm [%] |
|---|---|
| S1 | 3.8 |
| S11 | 2.5 |
| S12 | 2.1 |
| S13 | 2.3 |
| S14 | 7.5 |
| R3 | −0.9 |
| R11 | 0.31 |
| R12 | −1.4 |
| R13 | −15.0 |

As apparent from the table, according to Samples S1 and S11 to S14, all the light absorption change amounts showed a high value of 2.0% or more. On the other hand, according to Comparative Samples R3 and R11 to R13, all the light absorption change amounts showed a low value of 0.31% or less.

Figure 11:
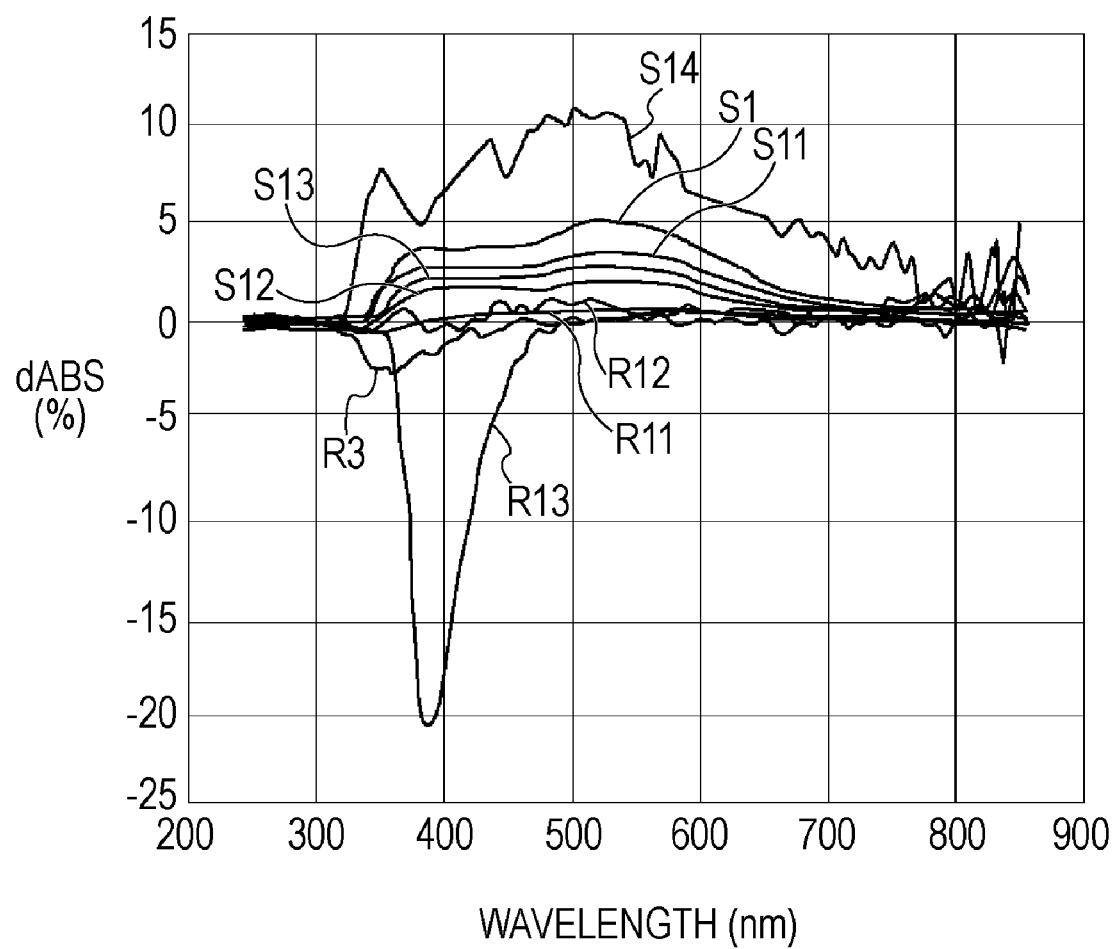
FIG. 11 is a graph showing the change in light absorption amount with wavelength.

In addition, in FIG. 11, the light absorption change amounts of Samples S1 and S11 to S14 and Comparative Samples R3 and R11 to R13 with respect to light having a wavelength of 330 to 800 nm are shown. As apparent from the figure, according to Samples S1 and S11 to S14, it was confirmed that the light absorption change amount with respect to light having a wide wavelength range of 350 to 650 nm showed a relatively high value.

In addition, the vaporizing temperatures of the photopolymerization initiators used in Example 2 were measured in a manner similar to that in Example 1. The vaporizing temperatures are shown in the following table.

TABLE 7

| PHOTOPOLYMERIZATION INITIATOR | VAPORIZING TEMPERATURE [° C.] |
|---|---|
| A | 290 |
| D | 280 |

TABLE 7-continued

| PHOTOPOLYMERIZATION INITIATOR | VAPORIZING TEMPERATURE [° C.] |
|---|---|
| E | 147 |
| F | 280 |

(4-2-3) Measurement of Recording Rate

The recording rates of Samples S1 and S11 to S14 and Comparative Samples R3 and R11 to R13 were measured in a manner similar to that in Example 1. The recording rates of Samples S1 and S11 to S14 and Comparative Samples R3 and R11 to R13 are shown in the following table.

TABLE 8

| SAMPLE | RECORDING TIME [msec] | LIGHT ABSORPTION CHANGE AMOUNT AT 405 nm [%] |
|---|---|---|
| S1 | 5.0 | 3.8 |
| S11 | 9.0 | 2.5 |
| S12 | 10.0 | 2.1 |
| S13 | 8.0 | 2.3 |
| S14 | 0.26 | 7.5 |
| R3 | 900.0 | −0.9 |
| R11 | 11.0 | 0.31 |
| R12 | 13.0 | −1.4 |
| R13 | 30.0 | −15.0 |

As apparent from the table, according to Samples S1 and S11 to S14 in which the light absorption change amount showed a high value of 2.1% or more, all the recording times showed a small value of 10 milliseconds or less. On the other hand, according to Comparative Samples R3 and R11 to R13 in which the light absorption change amount showed a low value of 0.31% or less, all the recording times showed a high value of 11 milliseconds or more. According to Comparative Sample R11, since the recording time was 11 milliseconds, which was slightly more than 10 milliseconds, in order to decrease the recording time to 10 milliseconds or less, the recording layer 101 is preferably formed so as to increase the light absorption change amount to 0.4% or more and further to 2.1% or more.

In addition, as shown in Table 1, also in Samples S1 and S11 to S14 in which one of the photopolymerization initiators A, D, and F was used as an acid generator, the recording time showed a low value of 10 milliseconds or less.

Furthermore, although the photopolymerization initiator A was used as an acid generator for both Sample S1 and Comparative Sample R11, 1.0 part by weight of the photopolymerization initiator A was blended with 100 parts by weight of the monomers in Sample 1, and in Comparative Sample R11, 0.6 parts by weight the photopolymerization initiator A was blended with 100 parts by weight of the monomers.

Since the recording time of Comparative Sample R11 showed a high value of 11 milliseconds as compared to that of Sample S1, it was found that 0.7 parts by weight or more of the acid generator was preferably blended with 100 parts of monomers, and that 1.0 part of weight or more was more preferably blended therewith.

It was found that when one of a fluorene difunctional acrylate (Samples S12 and S13) and a fluorene difunctional epoxy (Sample S11), each having a fluorene structure, was used, the recording time could also be shortened. From the result described above, it was found that when the recording layer 101 was initialized by the initializing light L1, cationic polymerization and radical polymerization could both be used. In other words, since having no influence on the recording time, a method for polymerizing monomers can be freely selected.

Furthermore, according to Sample S11, it was also found that when the photopolymerization initiator A generating an acid and a fluorene difunctional epoxy starting polymerization by an acid were used in combination, an acid generator generating an acid could be made to also function as a photopolymerization initiator that starts a photoreaction of monomers. For example, according to Samples S1, S12, and S13, it is believed that depending on the polymerization method of monomers, the photopolymerization initiator E functions as a photopolymerization initiator, and the photopolymerization initiators A and D simply function as an acid generator.

In addition, according to Sample S14 in which octylfluorene (general formula (7)) having no functional group was used as a compound having a fluorene structure, it was also found that the recording time could be shortened. From this result, it was confirmed that even when octylfluorene not responsible for photoreaction was simply added to a photopolymerizing material, an effect of shortening the recording time could be obtained.

Furthermore, according to Sample S14, the recording time could be significantly shortened to 0.26 milliseconds as compared to that of Samples S1 and S11 to S13 (recording time: 5.0 to 10.0 milliseconds). It is believed that this effect be obtained because of the structure of octylfluorene. In addition, since the light absorption change amount of Sample S14 was large, such as 7.5%, as compared to 2.1% to 3.8% of the other Samples S1 and S11 to S13, it was found that when the light absorption change amount was large, the recording time could be further shortened.

In addition, according to Sample S1, since the heat absorption change amount of Example 1 showed a high value of 17.5%, and the light absorption change amount of Example 2 also showed a high value of 3.8%, it was found that in response to both heat and light, the absorption amount with respect to the recording light beams L2c was changed. It is believed that according to Sample S1, since the acid-reactive compound can be rapidly modified in response to both light and heat by the recording light beams L2c, the recording mark RM can be rapidly formed. The recording time of Sample S1 actually had a relatively low value of 5.0 milliseconds as compared to those of the other samples.

(4-3) Conclusions

From the results thus obtained, it was found that when the photopolymerization initiator A or B or the Lewis acid compound C, each having a high cation activity, as an acid generator and a fluorene difunctional acrylate as an acid-reactive compound were contained, the recording layer 101 could increase the heat absorption change amount and could shorten the recording time.

In addition, it can be expected that when both the heat absorption change amount and the light absorption change amount are increased, the recording time is shortened by a synergistic effect between light and heat.

Furthermore, it was confirmed that even by adding a compound, such as octylfluorene, which was not polymerized by a photoreaction as an acid-reactive compound, the light absorption change amount could be increased, and the recording time could be shortened. From the result thus obtained, it can be estimated that when the acid generator and the acid-sensitive compound are appropriately selected, even by addition of a compound that is not to be polymerized by a photoreaction as an acid-reactive compound, as in the case described above, the heat absorption change amount can be increased, and the recording time can be shortened.

That is, although measurement of the heat absorption change amount was not performed for Sample S14 in which octylfluorene was contained, since the photopolymerization initiator A, which was the same photopolymerization initiator as that contained in Sample S1, was used as an acid generator, the recording time is very likely to be shortened because of a synergistic effect between light and heat.

In addition, by selecting monomers not to be polymerized by an acid, the photopolymerization initiators A, B, and D generating an acid can be made to hardly contribute to a photoreaction at the initialization stage and can be made to function simply as an acid generator. On the other hand, it was also confirmed that by selecting monomers to be polymerized by an acid, the photopolymerization initiator A generating an acid was not only used as an acid generator but could also be used as a photopolymerization initiator contributing to a photoreaction at the initialization stage.

(5) OPERATION AND EFFECT

In the above structure, the recording layer 101 of the optical information recording medium 100 absorbs the recording light beams L2c in accordance with their wavelengths, the beams L2c being condensed for information recording, and increases the temperature in the vicinity of the focus Fb to form the recording mark RM. The recording layer 101 has properties of increasing the light absorption amount (that is, the heat absorption change amount is large) with respect to the wavelength of the recording light beams L2c used as recording light by heating at 100° C. or more.

As a result, in the recording layer 101, in response to the increase in temperature in the vicinity of the focus Fb by irradiation of the recording light beams L2c, the light absorption amount with respect to the recording light beams L2c can be increased, and the temperature in the vicinity of the focus Fb is rapidly increased by effectively absorbing the recording light beams L2c, so that the recording mark RM can be formed within a short period of time.

In addition, although the recoding layer 101 can increase the light absorption amount in a moment in response to light having a high intensity, such as the condensed recording light beams L2c, the light absorption amount in a region on which the recoding light beams L2c are not radiated (that is, a portion at which the recording mark RM is not formed) is still small, and hence the transmittance of the recording layer 101 can still be maintained high. That is, in the recording layer 101, although the recording mark RM can be rapidly formed by increasing the light absorption amount in the vicinity of the focus Fb of the recording light beams L2c, the recording light beams L2c can be transmitted at a high transmittance in the region other than the vicinity of the focus Fb.

In addition, since the recording layer 101 increases the light absorption amount per 0.1 mm thickness thereof by 2.4% or more and preferably by 4.8% or more by heating, energy of the recording light beams L2c can be effectively converted into heat, so that the recording time forming the recording mark RM can be further shortened.

Furthermore, when the recording layer 101 contains at least one of the photopolymerization initiators A, B, and E and the Lewis acid compound C, each having a vaporizing temperature in the range of 140° C. to 400° C., and when the recording light beams L2c are condensed for information recording, the temperature in the vicinity of the focus Fb of the recording light beams L2c is increased to vaporize the at least one of the photopolymerization initiators A, B, and E and the Lewis acid compound C, so that an air bubble as the recording mark RM is formed. Accordingly, since the recording layer 101 effectively absorbs light energy of the recording light beams L2c by the acid-reactive compound modified by an acid to increase the temperature, the at least one of the photopolymerization initiators A, B, and E and the Lewis acid compound C is rapidly vaporized, and the recording mark RM can be rapidly formed.

In addition, the recording layer 101 is formed to contain an acid-reactive compound and an acid generator, which are materials increasing the light absorption amount with respect to the wavelength of the recording light beams L2c by heating at 120° C. or more.

As a result, in the recording layer 101, when information is recorded, the light absorption amount in the vicinity of the focus Fb can be increased due to a synergistic effect between heat energy and an acid caused by the irradiation of the recording light beams L2c, and the recording light beams L2c can be efficiently absorbed to rapidly increase the temperature in the vicinity of the focus Fb, so that the recording mark RM can be rapidly formed.

Furthermore, the recording layer 101 is formed of a cured resin obtained by photopolymerization of the liquid material M1 in which monomers, such as monomers or oligomers, and the photopolymerization initiator E as a vaporizing material are at least mixed together. In the liquid material M1, the photopolymerization initiator is excessively contained with respect to the monomers, so that the photopolymerization initiator is allowed to remain in the recording layer 101 obtained by the photopolymerization.

Accordingly, in the recording layer 101, the photopolymerization initiator that is excessively contained is vaporized as the temperature in the vicinity of the focus Fb is increased, so that the recording mark RM can be formed.

The recording layer 101 contains an acid generator that generates an acid and an acid-reactive compound to be modified by an acid and heat to increase the light absorption amount with respect to the recording light beams L2c, and when the recording layer 101 absorbs the recording light beams L2c in accordance with their wavelengths, the beams L2c being condensed for information recording, and increases the temperature in the vicinity of the focus Fb, the acid generator generates an acid.

Accordingly, in the recording layer 101, when the acid-reactive compound is modified, the recording light beams L2c are efficiently absorbed by the modified acid-reactive compound having an increased light absorption amount, and the temperature in the vicinity of the focus Fb is rapidly increased, so that the recording mark RM can be formed within a short period of time.

The recording layer 101 contains a cation generating photopolymerization initiator or a Lewis acid compound, each having a vaporizing temperature in the range of 140° C. to 400° C., and an acid-reactive compound to be modified in response to the acid generated from the cation generating photopolymerization initiator or the Lewis acid compound. In the recording layer 101, when the recording light beams L2c are condensed for information recording, the temperature in the vicinity of the focus Fb thereof is increased, and the cation generating photopolymerization initiator or the Lewis acid compound is vaporized, so that a cavity is formed as the recording mark RM.

Accordingly, in the recording layer 101, since the light absorption amount of the modified acid-reactive compound with respect to the recording light beams L2c is large, the temperature in the vicinity of the focus Fb can be increased by absorbing a larger number of the recoding light beams L2c, so that the recording time forming the recording mark RM can be shortened.

The recording layer 101 absorbs the recording light beams L2c in accordance with their wavelengths, the beams L2c being condensed for information recording, and increases the temperature in the vicinity of the focus Fb so as to form the recording mark RM, and in addition, the recording layer 101 contains an acid generator generating an acid and a compound having a fluorene structure represented by the general formula (1).

Accordingly, in the recording layer 101, the compound having a fluorene structure represented by the general formula (1) is modified by an acid generated when the recording light beams L2c is radiated, and the light absorption amount of the compound thus modified is increased, so that the recording mark RM can be formed within a short period of time.

According to the structure described above, the recording layer 101 of the optical information recording medium 100 has properties of increasing the light absorption amount in response to heating at 120° C. or more. Hence, in the recording layer 101, in an information recording step, the light absorption amount with respect to the recording light beams L2c can be increased in response to the irradiation thereof, the temperature in the vicinity of the focus Fb is rapidly increased, and the recording mark RM can be formed within a short period of time, so that an optical information recording medium that can improve a recording rate can be realized.

(6) OTHER EMBODIMENTS

In the above embodiment, although the case in which the recording mark RM made of an air bubble (that is, a cavity) is formed in the recording layer 101 is described, the present invention is not limited thereto, and a recording mark in which the refractive index in the vicinity of the focus Fb is changed by a chemical reaction in response to the recording light beams L2c may also be formed. The point is that the detectable returned light beams L3 can be generated by reflecting the reading light beams L2d by the recording mark.

In addition, in the above embodiment, although the case in which the reading light beams L2d are radiated to the recording mark RM, and the presence of the recording mark RM is detected by the returned light beams L3 reflected by the recording mark RM is described, the present invention is not limited thereto. For example, the presence of the recording mark RM may be detected by receiving transmitted light beams of the reading light beams L2d, followed by detecting increase and decrease in the light amount thereof.

Furthermore, in the embodiment described above, although the case in which the liquid material M1 is composed of monomers and a photopolymerization initiator is described, the present invention is not limited thereto. As constituent materials of the liquid material M1, for example, heat-curing monomers, a curing agent curing the monomers, a binder polymer or oligomer, an initiator performing a photopolymerization, and whenever necessary, a sensitizing dye may also be added as long as the photopolymerization initiator is contained in the recording layer 101 obtained by curing.

In addition, as the binder component to be added whenever necessary, for example, compounds that may be used as a plasticizer, such as ethylene glycol, glycerin, derivatives thereof, and polyalcohols; phthalic esters and derivatives thereof; naphthalene dicarboxylic acid esters and derivatives thereof; phosphoric acid esters and derivatives thereof, fatty acid diesters and derivatives thereof, may be mentioned. As the photopolymerization initiator used in this case, a compound that can be appropriately decomposed by a post treatment performed after information is recorded is preferably used. In addition, as the sensitizing dye, for example, a cyanine, a coumarin, and a quinoline dye may be mentioned.

In addition, in the embodiment described above, although the case in which the photopolymerization initiator or the Lewis acid compound, each having a vaporizing temperature in the range of 140° C. to 400° C., is contained in the recording layer 101 is described, the present invention is not limited thereto, and a compound having a vaporizing temperature in the range of 140° C. to 400° C. may also be contained in the recording layer 101 as a vaporizing material.

Furthermore, in the embodiment described above, although the case in which when the heat absorption change amount and the light absorption change amount at a wavelength of 405 nm are measured, the light absorption amount at each wavelength in the range of 350 to 800 nm is measured by a spectral photometer is described, the present invention is not limited thereto. For example, by radiating light having a light intensity of 0.3 $\mu W/cm^2$ at a wavelength of 405 nm, the light absorption amount may also be measured.

Furthermore, in the embodiment described above, although the case in which the photopolymerization initiator and the cured resin contained in the recording layer absorb the recording light beams L2c to generate heat is described, the present invention is not limited thereto, and for example, one of the photopolymerization initiator and the cured resin may absorb the recording light beams L2c to generate heat. In addition, a compound other than the photopolymerization initiator, such as the cured resin contained in the recording layer and/or an additive to be added whenever necessary, may cause a chemical reaction (such as a combination and/or a decomposition reaction caused by heat or light) in response to the recording light beams L2c to generate heat so as to increase the temperature in the vicinity of the focus Fb.

In addition, in the embodiment described above, although the case in which the recording layer 101 is formed of cured photopolymers, that is, a cured photo-curing resin, is described, the present invention is not limited thereto. For example, also in the case in which a vaporizing material that corresponds to photopolymerization initiator residues forming a cavity by vaporization is contained in a recording layer made of a cured heat-curing resin, and in which a chemical reaction occurs in this recording layer by the initializing light L1, the effect equivalent to that of the above embodiment can be obtained.

Furthermore, in the embodiment described above, although the case in which the parallel initializing light L1 is radiated on the optical information recording medium 100 in the initializing treatment (FIG. 2) is described, the present invention is not limited thereto, and for example, the initializing light L1 in the form of diffusion light or convergent light may also be radiated on the optical information recording medium 100.

Furthermore, in the embodiment described above, although the case in which the initializing light L1 performing an initializing treatment on the optical information recording medium 100, the recording light beams L2c recording information in the optical information recording medium 100, and the reading light beams L2d reproducing information therefrom are designed to have the same wavelength is described, the present invention is not limited thereto. For example, while the recording light beams L2c and the reading light beams L2d are designed to have the same wavelength, the initializing light L1 may be designed to have a different wavelength, or the initializing light L1, the recording light beams L2c, and the reading light beams L2d may be designed to have different wavelengths from each other.

In the case described above, it is preferable that the initializing light L1 have a wavelength sensitive to a photoreaction of a photo-curing resin forming the recording layer 101, that the recording light beams L2c have a wavelength which increases the temperature by thermal conduction of a substance or which is likely to be absorbed, and that the reading light beams L2d have a wavelength at which the highest resolution can be obtained. In this case, for example, in accordance with the wavelengths of the recording light beams L2c and the reading light beams L2d, the NA or the like of the object lens 13 (FIG. 8) may be appropriately adjusted, and furthermore, two types of object lenses optimized for the recording light beams L2c and the reading light beams L2d may be exchangeably used when the information is recorded and is reproduced, respectively.

In addition, as for photopolymers forming the recording layer 101, components and the like thereof may be appropriately adjusted so as to obtain the most preferable properties in combination between wavelengths of the initializing light L1, the recording light beams L2c, and the reading light beams L2d.

In addition, in the embodiment described above, although the case in which the recording light beams L2c and the reading light beams L2d, both of which are emitted from the recording/reproducing light source 2, are designed to have a wavelength of 405 to 406 nm is described, the wavelengths thereof may be changed as long as a cavity can be appropriately formed as the recording mark RM in the vicinity of the target position in the recording layer 101. In addition, as shown in FIG. 5, since the heat absorption change amounts of Samples S2, S3, and S4 are increased at a wavelength in the range of approximately 350 to 600 nm as well as at a wavelength of 405 nm, when the wavelength of the recording light beams L2c is selected from the range of 350 to 600 nm, an effect equivalent to that obtained in the above embodiment can also be obtained.

Furthermore, in the embodiment described above, although the case in which the initializing light L1, the recording light beams L2c, and the reading light beams L2d are respectively radiated from the substrate 102 side of the optical information recording medium 100 is described, the present invention is not limited thereto, and the light or the light beams described above may be respectively radiated from any of the two substrate sides or from the two substrate sides, for example, in such a way that the initializing light L1 is radiated from the substrate 103 side.

In addition, in the above embodiment, although the case in which after the optical information recording medium 100 is fixed to the table 4, the optical pickup 7 is moved in the X, the Y, and the Z directions to form the recording mark RM in the recording layer 101 at an arbitrary position that is set as a target position is described, the present invention is not limited thereto. For example, after the optical information recording medium 100 is formed as an optical information recording medium such as a CD or a DVD, the optical information recording medium may be driven by rotation, and at the same time, the optical pickup 7 may be moved in the X and the Y directions so as to perform recording and reproducing of information. In this case, for example, by forming a groove-shaped or a pit-shaped track at a boundary surface between the substrate 102 and the recording layer 101, tracking control, focus control, and the like may be performed.

Furthermore, in the embodiment described above, although the case in which the recording layer 101 of the optical information recording medium 100 is formed to have a square shape having a side length of approximately 50 mm and a thickness t1 of approximately 0.05 to 1.0 mm is described, the present invention is not limited thereto, and the recording layer 101 may be formed to have other arbitrary dimensions or may be formed to have various shapes, such as a square shape, a rectangular shape, or a rectangular parallelepiped having various dimensions. In this case, the thickness t1 in the Z direction is preferably determined in consideration of the transmittance and the like of the recording light beams L2c and the reading light beams L2d.

Accordingly, the shapes of the substrates 102 and 103 are not limited to a square shape or a rectangular shape, and various shapes may be used in conformity with that of the recording layer 101. In addition, the material for the substrates 102 and 103 is not limited to glass, and for example, polycarbonate may also be used. The point is that any material may be used as long as the initializing light L1, the recording light beams L2c, and the reading light beams L2d can be transmitted therethrough at a relatively high transmittance. In addition, instead of using the returned light beams L3, by detecting light modulation of the reading light beams L2d in accordance with the presence of the recording mark RM using a light receiving element disposed to receive transmitted reading light beams L2d, information may be reproduced based on the light modulation of the reading light beams L2d. In addition, for example, when a desired intensity can be obtained by the recording layer 101 itself, the substrates 102 and 103 may be removed from the optical information recording medium 100.

In addition, in the embodiment described above, although the case in which the optical information recording medium 100 functioning as an optical information recording medium is formed of the recording layer 101 functioning as a recording layer is described, the present invention is not limited thereto, the optical information recording medium may be formed using at least one of recording layers having various structures.

The present application contains subject matter related to that disclosed in Japanese Priority Patent Application JP 2008-173667 filed in the Japan Patent Office on Jul. 2, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical information recording medium comprising:
a recording layer including a cured resin comprising an acid generator having a vaporizing temperature in a range of 140° C. to 400° C. and an acid-reactive compound, the cured resin adapted to absorb condensed recording light having a wavelength of approximately 350 to 600 nm for recording optical information such that upon exposure of the cured resin to a focal point of the condensed recording light, a temperature in a vicinity of the focal point of the condensed recording light increases so as to vaporize the vaporizing material, wherein the cured resin includes a cavity formed from vaporized material as a recording mark representing optical data formed in the vicinity of the focal point of the condensed recording light, and wherein the recording layer has properties of increasing a light absorption amount with respect to the wavelength of the condensed recording light by heating performed at a temperature of 120° C. or more.

2. The optical information recording medium according to claim 1,
wherein the recording layer is adapted to increase the light absorption amount per 0.1 mm in thickness of the recording layer by 2.4% or more by the heating.

3. The optical information recording medium according to claim 2,
wherein the recording layer is adapted to increase the light absorption amount per 0.1 mm in thickness of the recording layer is 4.8% or more by the heating.

4. The optical information recording medium according to claim 2,
wherein the recording layer has a thickness of 0.05 mm to 1,000 mm.

5. The optical information recording medium according to claim 1,
wherein the recording layer comprises a material increasing the light absorption amount with respect to the wavelength of the condensed recording light by the heating performed at a temperature of 100° C. or more.

6. The optical information recording medium according to claim 5,
wherein the cured photo-curing resin is cured by photopolymerization of a liquid material at least containing monomers or oligomers and a photopolymerization initiator used as the vaporizing material, and
the liquid material contains an excessive amount of the photopolymerization initiator with respect to the monomers or oligomers, so that the photopolymerization initiator remains in the recording layer.

7. The optical information recording medium according to claim 6,
wherein the material increasing the light absorption amount with respect to the wavelength of the condensed recording light by the heating performed at a temperature of 100° C. or more forms at least part of the cured photo-curing resin that is cured by photopolymerization of the monomers or the oligomers.

8. The optical information recording medium according to claim 5,
wherein the recording layer comprises a thermoplastic resin.

9. The optical information recording medium according to claim 1,
wherein the recording mark has a refractive index different from that in the vicinity thereof.

10. The optical information recording medium according to claim 1,
wherein the recording mark includes an air bubble.

11. An optical information recording medium comprising:
a recording layer including a cured resin adapted to absorb condensed recording light having a wavelength of approximately 350 to 600 nm for recording optical information such that upon exposure of the cured resin to a focal point of the condensed recording light, a temperature in a vicinity of the focal point of the condensed recording light increases, wherein the cured resin includes a cavity formed as a recording mark representing optical data formed in the vicinity of the focal point of the condensed recording light, the recording layer including an acid generator generating an acid and having a vaporizing temperature in a range of 140° C. to 400° C. and an acid-reactive compound that is modified by the acid and heat to increase a light absorption amount with respect to the recording light.

12. The optical information recording medium according to claim 11,
   wherein the acid generator generates a super strong acid having an acidity stronger than that of sulfuric acid.

13. The optical information recording medium according to claim 12,
   wherein the acid generator comprises a cation generating photopolymerization initiator.

14. The optical information recording medium according to claim 13,
   wherein the acid generator comprises a compound represented by general formula (1)

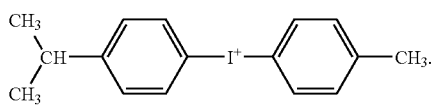
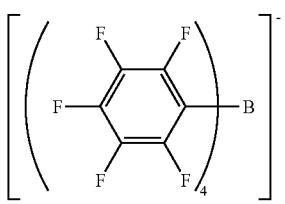

General Formula (1)

15. The optical information recording medium according to claim 13,
   wherein the acid generator comprises a compound represented by general formula (3)

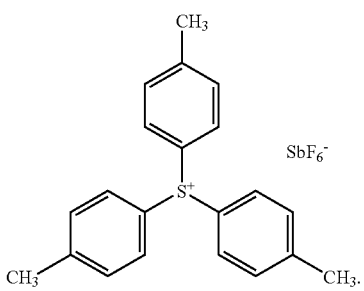

General Formula (3)

16. The optical information recording medium according to claim 11,
   wherein the acid generator generates $B(C_6F_5)_4^-$.

17. The optical information recording medium according to claim 11,
   wherein the acid generator generates $SbF_6^-$.

18. The optical information recording medium according to claim 11,
   wherein the acid generator comprises a Lewis acid.

19. The optical information recording medium according to claim 18,
   wherein the acid generator comprises a compound represented by general formula (2)

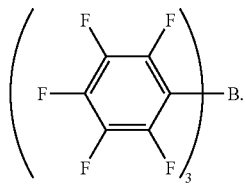

General Formula (2)

20. The optical information recording medium according to claim 11,
   wherein the acid-reactive compound is a compound having a fluorene structure represented by general formula (4)

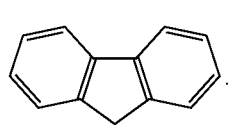

General Formula (4)

21. The optical information recording medium according to claim 20,
   wherein the acid-reactive compound is a compound represented by general formula (5)

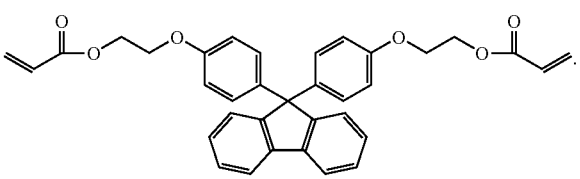

General Formula (5)

22. The optical information recording medium according to claim 20,
   wherein the acid-reactive compound comprises a cured resin obtained by photopolymerization of a compound represented by general formula (5) and a photopolymerization initiator mixed therewith

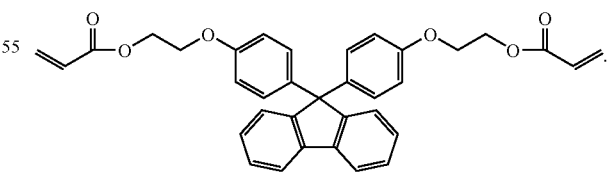

General Formula (5)

23. The optical information recording medium according to claim 20,
   wherein the acid-reactive compound is a compound represented by general formula (6)

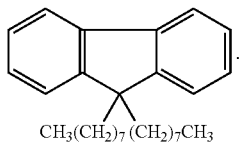

General Formula (6)

24. The optical information recording medium according to claim 20,
wherein the acid-reactive compound is a compound including the fluorene structure and an epoxy group.

25. An optical information recording medium comprising:
a recording layer that includes a cured resin comprising a cation generating photopolymerization initiator or a Lewis acid compound, each having a vaporizing temperature in a range of 140° C. to 400° C., and an acid-reactive compound to be modified by an acid generated from the cation generation photopolymerization initiator or the Lewis acid compound, wherein upon exposure of the cured resin to condensed recording light, a temperature in a vicinity of a focal point of the condensed recording light increases so as to vaporize the photopolymerization initiator or the Lewis acid compound so as to form a cavity as a recording mark, wherein the cured resin includes the cavity as a recording mark representing optical data formed in the vicinity of the focal point of the condensed recording light.

26. An optical information recording medium comprising:
a recording layer including a cured resin that absorbs condensed recording light in accordance with a wavelength of the condensed recording light for information recording, wherein upon exposure of the cured resin to the condensed recording light, a temperature in a vicinity of a focal point of the condensed recording light increases, wherein the cured resin includes a cavity formed as a recording mark representing optical data formed in the vicinity of the focal point of the condensed recording light, the recording layer including an acid generator generating an acid and having a vaporizing temperature in a range of 140° C. to 400° C. and a compound having a fluorene structure represented by general formula (4)

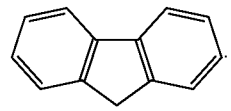

General Formula (4)

* * * * *